United States Patent
Liu et al.

(10) Patent No.: US 12,021,586 B2
(45) Date of Patent: Jun. 25, 2024

(54) METHODS AND APPARATUS FOR OPERATING IN A WIDEBAND COMMUNICATION SYSTEM

(71) Applicant: Huawei Technologies Co., Ltd., Shenzhen (CN)

(72) Inventors: Jialing Liu, Palatine, IL (US); Qian Cheng, Naperville, IL (US); Weimin Xiao, Hoffman Estates, IL (US); Diana Maamari, Palatine, IL (US); Anthony C. K. Soong, Plano, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 266 days.

(21) Appl. No.: 17/644,743

(22) Filed: Dec. 16, 2021

(65) Prior Publication Data
US 2022/0109479 A1  Apr. 7, 2022

Related U.S. Application Data

(63) Continuation of application No. PCT/US2020/023955, filed on Mar. 20, 2020.
(Continued)

(51) Int. Cl.
H04B 7/06  (2006.01)
H04B 7/08  (2006.01)
H04L 25/02  (2006.01)

(52) U.S. Cl.
CPC ........ H04B 7/0617 (2013.01); H04B 7/0636 (2013.01); H04B 7/0842 (2013.01); H04L 25/0224 (2013.01)

(58) Field of Classification Search
CPC .. H04B 7/0617; H04B 7/0636; H04B 7/0842; H04B 7/0619; H04L 25/0224; H04L 25/0248
(Continued)

(56) References Cited

U.S. PATENT DOCUMENTS

2007/0243839 A1* 10/2007 Kostic ................. H04B 7/0413
455/562.1
2012/0045003 A1  2/2012 Li et al.

FOREIGN PATENT DOCUMENTS

EP  2340621 A1  7/2011

OTHER PUBLICATIONS

Xu, M., et al., "Distributed Bi-Directional Training of Nonlinear Precoders and Receivers in Cellular Networks", IEEE Transations on Signal Processing, vol. 63, No. 21, Nov. 1, 2015, 12 Pages.
(Continued)

Primary Examiner — Fitwi Y Hailegiorgis
(74) Attorney, Agent, or Firm — Slater Matsil, LLP

(57) ABSTRACT

A method implemented by a first device operating in a communication system includes obtaining a channel representation of a set of channels between the first device and a second device, the set of channels being over a set of subcarriers, the first device having multiple antenna ports, and the second device having one or multiple antenna ports; determining, by the first device, one or multiple communication filters in accordance with at least the channel representation; and applying, by the first device, the one or multiple communication filters to a communication on at least one of the multiple antenna ports of the first device, the communication being over the set of subcarriers.

18 Claims, 13 Drawing Sheets

Related U.S. Application Data

(60) Provisional application No. 62/862,495, filed on Jun. 17, 2019.

(58) Field of Classification Search
USPC .......................................................... 375/267
See application file for complete search history.

(56) References Cited

OTHER PUBLICATIONS

Zhou, H., et al., "Bi-directional Training with Rank Optimization and Fairness Control", 2018 IEEE 88th Vehicular Technology Conference (VTC-Fall), Aug. 27-30, 2018, 6 Pages.

\* cited by examiner

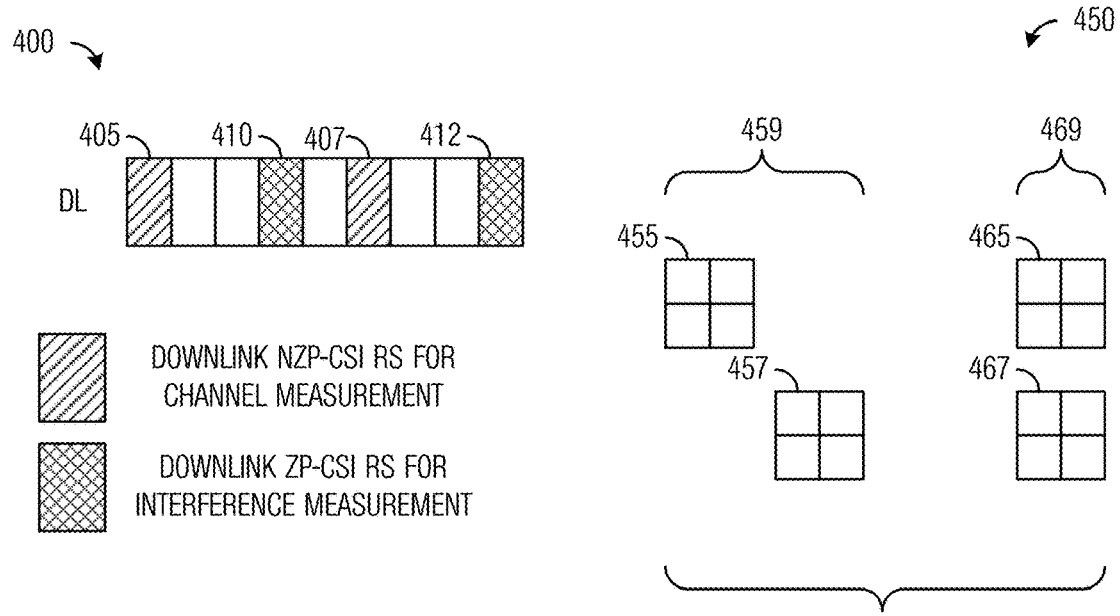
*Fig. 4A*
*Fig. 4B*
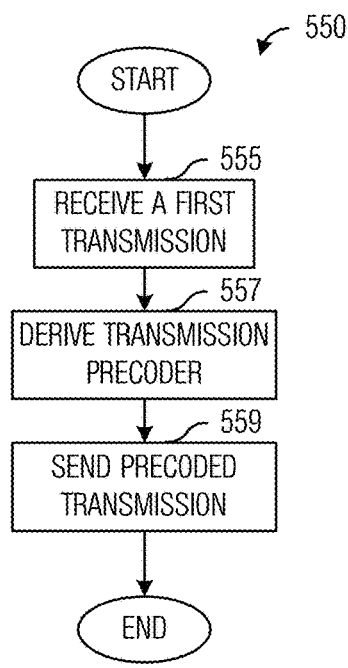
*Fig. 5*
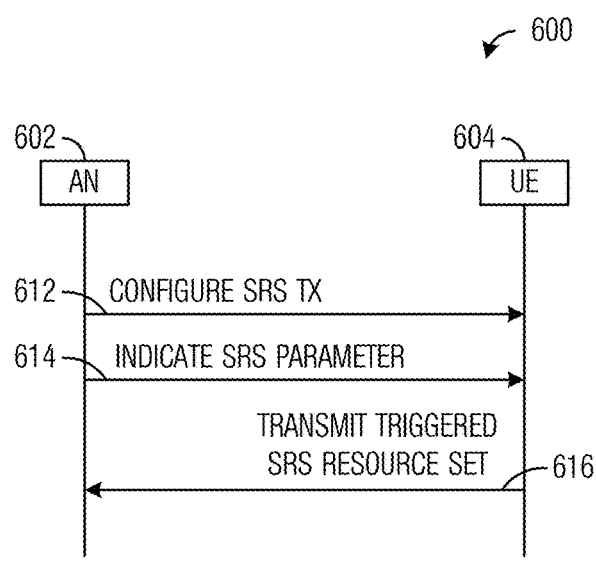
*Fig. 6*

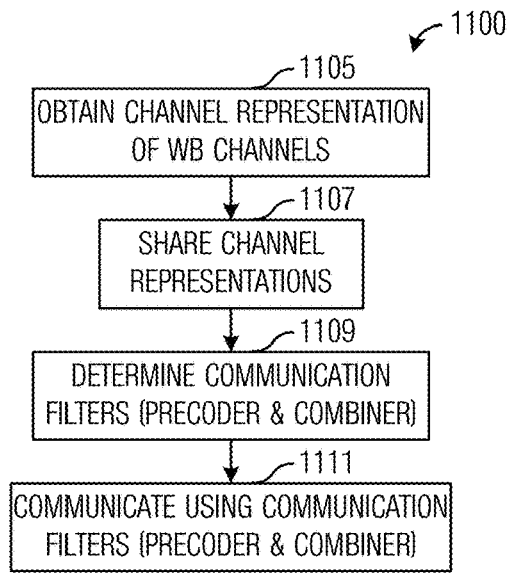
*Fig. 11*
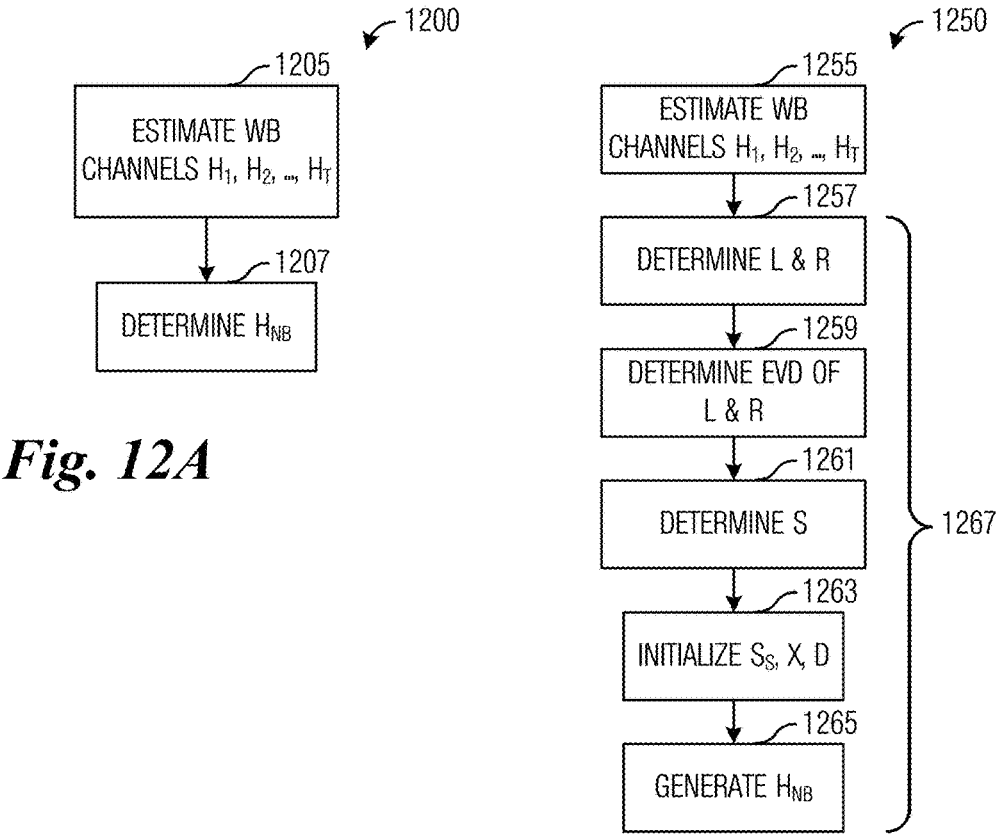
*Fig. 12A*
*Fig. 12B*

METHODS AND APPARATUS FOR OPERATING IN A WIDEBAND COMMUNICATION SYSTEM

CROSS-REFERENCE TO RELATED APPLICATIONS

This application is a continuation of International Application No. PCT/US20/23955, filed on Mar. 20, 2020, which claims priority to U.S. Provisional Application No. 62/862,495, filed on Jun. 17, 2019, entitled "System and Method for Wideband MIMO Communications." The disclosures of the aforementioned applications are hereby incorporated by reference in their entireties.

TECHNICAL FIELD

The present disclosure relates generally to methods and apparatus for digital communications, and, in particular embodiments, to methods and apparatus for operating in a wideband communication system.

BACKGROUND

Fifth Generation (5G) mobile system depends upon massive multiple-input multiple-output (MIMO) systems to deliver the high spectrum efficiency (SE) necessary to meet the ever increasing demand of user data rates. Various massive MIMO techniques, most prominently zero-forcing (ZF), eigen ZF (EZF), and weighted minimum mean square error (MMSE), have been researched which have demonstrated significant improvement in spectrum efficiency. However, though effectively suppressing intra-cell interference, these techniques do not control inter-cell interference and consequently left much of the anticipated gains from massive MIMO untapped.

A main reason for unexpected performance is a requirement for knowledge of Channel State Information (CSI) between all of the coordinating transmit points and receive points. To address this issue, several distributed CSI acquisition methods were introduced. One such promising technique Bi-directional training (BiT) was first reported for adaptive beamforming with analog interference pricing in time division duplexed (TDD) communication systems. BiT showed considerable suppression of inter-/intra-cell interference in narrowband (NB) (i.e., frequency-non-selective) multi-cell TDD communication systems.

However, a majority of current and future communication systems are wideband (WB), there is a need to extend BiT to wideband communication systems.

SUMMARY

According to a first aspect, a method implemented by a first device operating in a communication system is provided. The method comprising obtaining, by the first device, a channel representation of a set of channels between the first device and a second device, the set of channels being over a set of subcarriers, the first device having multiple antenna ports, and the second device having one or multiple antenna ports; determining, by the first device, one or multiple communication filters in accordance with at least the channel representation; and applying, by the first device, the one or multiple communication filters to a communication on at least one of the multiple antenna ports of the first device, the communication being over the set of subcarriers.

In a first implementation form of the method according to the first aspect as such, the channel representation comprising a channel matrix with dimensions being specified in accordance with the multiple antenna ports of the first device and the one or multiple antenna ports of the second device.

In a second implementation form of the method according to the first aspect as such or any preceding implementation form of the first aspect, determining of the one or more communication filters comprising utilizing a bi-directional training (BiT) process.

In a third implementation form of the method according to the first aspect as such or any preceding implementation form of the first aspect, obtaining the channel representation of the set of channels comprising receiving the channel representation of the set of channels from the second device.

In a fourth implementation form of the method according to the first aspect as such or any preceding implementation form of the first aspect, obtaining the channel representation of the set of channels comprising determining the channel representation of the set of channels in accordance with individual channel representations of the set of channels.

In a fifth implementation form of the method according to the first aspect as such or any preceding implementation form of the first aspect, determining the channel representation being in accordance with a phase domain component of the set of channels and a power/amplitude domain component of the set of channels.

In a sixth implementation form of the method according to the first aspect as such or any preceding implementation form of the first aspect, determining the channel representation comprising the phase domain component of the set of channels constrained under the power/amplitude domain component of the set of channels.

In a seventh implementation form of the method according to the first aspect as such or any preceding implementation form of the first aspect, obtaining the channel representation of the set of channels comprising: receiving, by the first device, reference signals transmitted on the set of channels over the set of subcarriers; estimating, by the first device, the individual channel representations in accordance with measurements of the received reference signals; and determining, by the first device, the channel representation in accordance with the individual channel representations.

In an eighth implementation form of the method according to the first aspect as such or any preceding implementation form of the first aspect, obtaining the channel representation of the set of channels comprising: receiving, by the first device, an indication of a subcarrier index; and selecting, by the first device, a channel estimate associated with the subcarrier index as the channel representation of the set of channels.

In a ninth implementation form of the method according to the first aspect as such or any preceding implementation form of the first aspect, the one or more communication filters comprising at least one of transmission precoders for a subset of the multiple antenna ports of the first device or reception combiners for the multiple antenna ports of the first device.

In a tenth implementation form of the method according to the first aspect as such or any preceding implementation form of the first aspect, the set of channels corresponding to a subset of the set subcarriers.

In an eleventh implementation form of the method according to the first aspect as such or any preceding implementation form of the first aspect, the communication comprising at least one of transmitting a first message or receiving a second message.

According to a second aspect, a method implemented by a first device operating in a communication system is provided. The method comprising: receiving, by the first device, signals transmitted on a set of channels over a set of subcarriers of the communication system, the first device having multiple antenna ports; determining, by the first device, a channel representation of the set of channels in accordance with the signals received on the set of channels over the set of subcarriers; and transmitting, by the first device, the channel representation.

In a first implementation form of the method according to the second aspect as such, further comprising receiving, by the first device, resource allocation information associated with resources conveying the received signals.

In a second implementation form of the method according to the second aspect as such or any preceding implementation form of the second aspect, transmitting the channel representation comprising transmitting, by the first device, an indication of a subcarrier index associated with the channel representation.

In a third implementation form of the method according to the second aspect as such or any preceding implementation form of the second aspect, transmitting the channel representation comprising transmitting, by the first device, an indication of the channel representation.

In a fourth implementation form of the method according to the second aspect as such or any preceding implementation form of the second aspect, further comprising determining, by the first device, one or more communication filters in accordance with the channel representation of the set of channels, determining the one or more communication filters utilizing a BiT process.

In a fifth implementation form of the method according to the second aspect as such or any preceding implementation form of the second aspect, the channel representation comprising a channel matrix with dimensions being in accordance with the multiple antenna ports of the first device and one or multiple receive antenna ports of a second device.

According to a third aspect, a device is provided. The device comprising: a non-transitory memory storage comprising instructions; and one or more processors in communication with the memory storage, wherein the one or more processors execute the instructions to: obtain a channel representation of a set of channels between a first device and a second device, the set of channels being over a set of subcarriers, the first device having multiple antenna ports, and the second device having one or multiple antenna ports; determine one or more communication filters in accordance with at least the channel representation; and apply the one or more communication filters to a communication on at least one of the multiple antenna ports of the first device, the communication over the set of subcarriers.

In a first implementation form of the device according to the third aspect as such, the one or more processors further execute the instructions to receive the channel representation of the set of channels from the second device.

In a second implementation form of the device according to the third aspect as such or any preceding implementation form of the third aspect, the one or more processors further execute the instructions to determine the channel representation of the set of channels in accordance with individual channel representations of the set of channels.

In a third implementation form of the device according to the third aspect as such or any preceding implementation form of the third aspect, the channel representation being determined in accordance with a phase domain component of the set of channels and a power/amplitude domain component of the set of channels.

In a fourth implementation form of the device according to the third aspect as such or any preceding implementation form of the third aspect, the channel representation comprising the phase domain component of the set of channels constrained under the power/amplitude domain component of the set of channels.

In a fifth implementation form of the device according to the third aspect as such or any preceding implementation form of the third aspect, the one or more processors further execute the instructions to: receive reference signals transmitted on the set of channels over the set of subcarriers; estimate the individual channel representations in accordance with measurements of the received reference signals; and determine the channel representation in accordance with the individual channel representations.

In a sixth implementation form of the device according to the third aspect as such or any preceding implementation form of the third aspect, the one or more processors further execute the instructions to: receive an indication of a subcarrier index; and select a channel estimate associated with the subcarrier index as the channel representation of the set of channels.

In a seventh implementation form of the device according to the third aspect as such or any preceding implementation form of the third aspect, the channel representation comprising a channel matrix with dimensions being specified in accordance with the multiple antenna ports of the first device and the one or multiple antenna ports of the second device.

In an eighth implementation form of the device according to the third aspect as such or any preceding implementation form of the third aspect, the one or more communication filters being determined utilizing a BiT process.

According to a fourth aspect, a device is provided. The device comprising: a non-transitory memory storage comprising instructions; and one or more processors in communication with the memory storage, wherein the one or more processors execute the instructions to: receive signals transmitted on a set of channels over a set of subcarriers of a communication system, the first device having multiple antenna ports; determine a channel representation of the set of channels in accordance with the signals received on the set of channels over the set of subcarriers; and transmit the channel representation.

In a first implementation form of the device according to the fourth aspect as such, the one or more processors further execute the instructions to receive resource allocation information associated with resources conveying the received signals.

In a second implementation form of the device according to the fourth aspect as such or any preceding implementation form of the fourth aspect, the one or more processors further execute the instructions to transmit an indication of a subcarrier index associated with the channel representation.

In a third implementation form of the device according to the fourth aspect as such or any preceding implementation form of the fourth aspect, the one or more processors further execute the instructions to transmit an indication of the channel representation.

In a fourth implementation form of the device according to the fourth aspect as such or any preceding implementation form of the fourth aspect, the one or more processors further execute the instructions to determine one or more communication filters in accordance with the channel representation of the set of channels, determining the one or more communication filters utilizing a BiT process.

An advantage of a preferred embodiment is that BiT is extended to WB communication systems without incurring significant overhead, as compared to BiT for NB communication systems.

Yet another advantage of a preferred embodiment is that a distributed BiT implementation is provided, enabling communicating devices to independently determine communicating filters (e.g., transmit precoders or receive combiners) instead of utilizing a centralized entity to determine the communicating filters. A centralized implementation may increase communication overhead and, potentially, increase the computational requirements at the centralized entity.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 4A illustrates example resources highlighting channel measurement resources (CMRs) and interference measurement resources (IMRs);

FIG. 4B illustrates example relationships between CMRs and IMRs and resource elements of orthogonal frequency division multiplexed (OFDM) symbols or physical resource blocks (PRBs);

FIG. 5 illustrates a flow diagram of example operations occurring in a UE supporting BiT training;

FIG. 6 illustrates a diagram of an example method for SRS communication;

FIG. 11 illustrates a flow diagram of example operations occurring at a device implementing a wideband BiT process according to example embodiments presented herein;

FIG. 12A illustrates a high-level view of example operations occurring in a device obtaining the channel representation of the wideband channels according to example embodiments presented herein;

FIG. 12B illustrates a detailed-level view of example operations occurring in a device obtaining the channel representation of the wideband channels according to example embodiments presented herein;

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
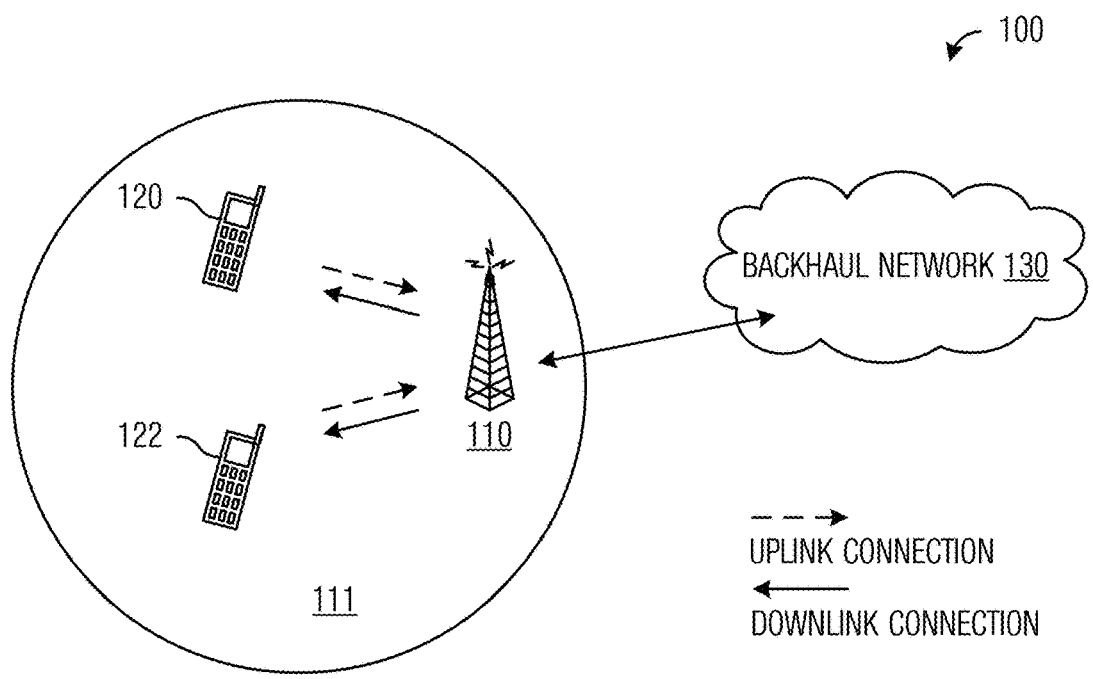
FIG. 1 illustrates an example wireless communication system.

FIG. 1 illustrates an example wireless communication system 100. Communication system 100 includes an access node 110 with coverage area 111. Access node 110 serves a plurality of user equipments (UEs), including UE 120 and UE 122. Transmissions from access node 110 to a UE is referred to as a downlink (DL) transmission and occurs over a downlink channel (shown in FIG. 1 as a solid arrowed line), while transmissions from a UE to access node 110 is referred to as an uplink (UL) transmission and occurs over an uplink channel (shown in FIG. 1 as a dashed arrowed line). Services may be provided to the plurality of UEs by service providers connected to access node 110 through a backhaul network 130, such as the Internet. The wireless communication system 100 may include multiple distributed access nodes 110.

In a typical communications system, there are several operating modes. In a cellular operating mode, communications to and from the plurality of UEs go through access node 110, while in device to device communications mode, such as proximity services (ProSe) operating mode, for example, direct communication between UEs is possible. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, relays, customer premises equipment (CPE), and so on. UEs may also be commonly referred to as mobile stations, mobiles, terminals, users, subscribers, stations, communication devices, CPEs, relays, Integrated Access and Backhaul (JAB) relays, and the like. It is noted that when relaying is used (based on relays, picos, CPEs, and so on), especially multihop relaying, the boundary between a controller and node controlled by the controller may become blurry, and a dual node (either the controller or the node controlled by the controller) deployment where a first node that provides configuration or control information to a second node is considered to be the controller. Likewise, the concept of UL and DL transmissions can be extended as well.

A cell may include one or more bandwidth parts (BWPs) for UL or DL allocated for a UE. Each BWP may have its own BWP-specific numerology and configuration. It is noted that not all BWPs need to be active at the same time for the UE. A cell may correspond to one or more carriers. Typically, one cell (a primary cell (PCell) or a secondary cell (SCell), for example) is a component carrier (a primary component carrier (PCC) or a secondary CC (SCC), for example). For some cells, each cell may include multiple carriers in UL, one carrier is referred to as an UL carrier or non-supplementary UL (non-SUL) UL carrier which has an associated DL, and other carriers are called a supplementary UL (SUL) carriers which do not have an associated DL. A cell, or a carrier, may be configured with slot or subframe formats comprised of DL and UL symbols, and that cell or carrier is seen as operating in time division duplexed (TDD) mode. In general, for unpaired spectrum, the cells or carriers are in TDD mode, and for paired spectrum, the cells or carrier are in a frequency division duplexed (FDD) mode. Access nodes may provide wireless access in accordance with one or more wireless communication protocols, e.g., long term evolution (LTE), LTE advanced (LTE-A), 5G, 5G LTE, 5G NR, High Speed Packet Access (HSPA), Wi-Fi 802.11a/b/g/n/ac, etc. While it is understood that communications systems may employ multiple access nodes capable of communicating with a number of UEs, only one access node, and two UEs are illustrated for simplicity.

In standard antenna element to element channel estimation, a channel between two devices is estimated by having a first device transmit a known signal on a known time or frequency resource (s) to a second device, the received signal at the second device is expressible as:

$$y=Hx+n \quad (1)$$

where y is the received signal at the second device, x is the known signal (which may be a reference signal, a pilot, or a pilot signal), H is the channel model or response, and n is the noise (and interference for some communication channels). Because x is known by the second device, it is possible for the second device to determine or estimate H from y.

The concept of antenna, antenna element, and antenna port may be generally interchangeable, but in some specific scenarios, they can mean different but related subjects. For example, one transmit (Tx) antenna port may be formed (or virtualized) by multiple antenna elements or antennas, and the receiver sees only the one Tx antenna port but not each of the multiple antenna elements or antennas. The virtualization may be achieved via beamforming, for example.

Figure 2:
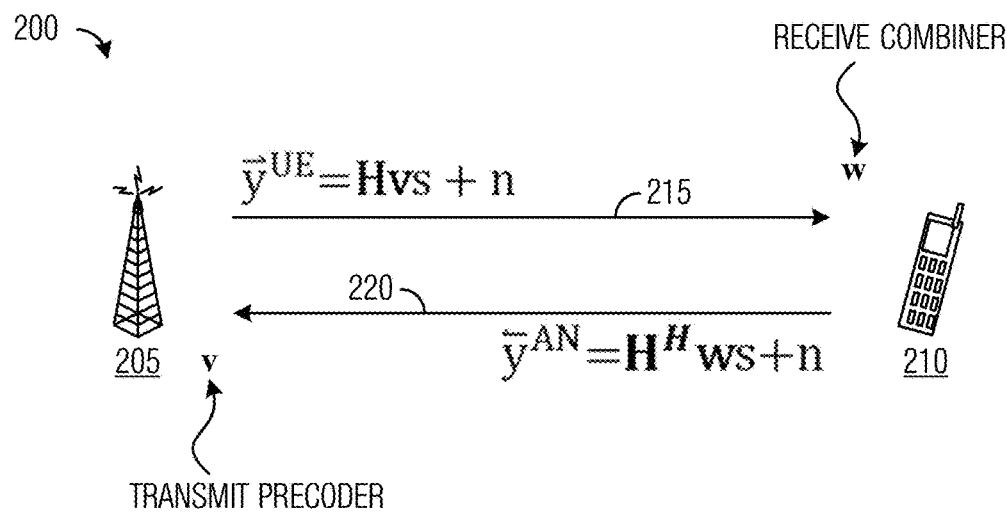
FIG. 2 illustrates an example communications system, providing mathematical expressions of signals transmitted in the communications system.

FIG. 2 illustrates an example communications system 200, providing mathematical expressions of signals transmitted in the communications system. Communications system 200 includes an access node 205 communicating with a UE 210. As shown in FIG. 2, access node 205 is using a transmit filter v and UE 210 is using a receive filter w. Both access node 205 and UE 210 use linear precoding or combining. Assuming H is $N_{rx} \times N_{tx}$ matrix of a multiple-input multiple-output (MIMO) system, i.e., there are $N_{tx}$ transmit antennas and $N_{rx}$ receive antennas. The transmit filter v of dimension $N_{tx} \times Ns$ enables the transmitter to precode or beamform the transmitted signal, where Ns is the number of layers, ports, streams, symbols, pilots, messages, data, or known sequences transmitted. The receive filter w of multi-antenna systems is of dimension $N_{rx} \times Ns$ and represents the combining matrix, which is usually applied on the received signal y according to $w^H y$. The above description is for a transmission from access node 205 to UE 210, i.e., a DL transmission. The transmission may also occur at the reverse direction (an UL transmission), for which the channel matrix becomes $H^H$ in the case of TDD (where $H^H$ is the Hermitian of channel model H), and w may be seen as the transmit filter and v as the receiver filter. The w for transmission and the w for reception may or may not be the same, and likewise for v.

A DL (or forward) channel 215 between access node 205 and UE 210 has channel model or response H, while an UL (or backward, or reverse) channel 220 between UE 210 and access node 205 has channel model or response $H^H$. (Another convention is that the UL channel is denoted as $H^T$, which is the transposition of channel model H.) Although FIG. 2 depicts only one access node and one UE, communication system 200 is not limited to this case. Multiple UEs may be served by the access node, on different time-frequency resources (such as in frequency division multiplexed-time division multiplexed (FDM-TDM) communication systems, as in typical cellular systems) or on the same time-frequency resources (such as in multi-user MIMO (MU-MIMO) communication systems, wherein multiple UEs are paired together and transmissions to each UE are individually precoded). Among the paired UEs, there is intra-cell interference.

Also multiple access nodes may exist in the network, some of which may be cooperatively serving UE 210 in a joint transmission fashion (such as in coherent joint transmission, non-coherent joint transmission, coordinated multipoint transmission, etc.), a dynamic point switching fashion, and so on. Some other access nodes may not serve UE 210 and their transmissions to their own UEs cause inter-cell interference to UE 210. The scenario of multiple access nodes and multiple UEs, with access node cooperation to serve a UE and with MU-MIMO, is a scenario considered herein.

Bi-directional training (BiT), also known as forward-backward training, is a generally distributed training procedure with low computational complexity that is used to train and update transmit precoders and receive combiners without explicitly estimating the CSI. BiT may adapt transmit beamformers, which may also be commonly known as transmit precoders, transmission filters, spatial transmission filters, transmit filter, analog precoder, and the like and receiver combiners (which are also commonly known as receive filter, spatial receive filters, analog combiner, and the like) in TDD MIMO communications systems. In BiT, neither device (a transmitting device or a receiving device) participating in BiT may have a priori knowledge of CSI, especially detailed information about the channel such as channel matrix H or covariance matrix of the channel, wherein the channel may be one between a UE and its serving access node(s) or one between a UE and its interfering access node(s) (which generally requires information exchanges among access nodes, such as channel information about an interfering link or RS information so that the UE or access node can estimate the interfering link). An iterative form of BiT consists of forward training (e.g., in a downlink direction) and backward training (e.g., in an uplink direction) that is repeated until convergence is achieved. A one-shot BiT comprises a single forward training step and a single backward training step. BiT is capable of adapting to unknown interference and can suppress interference without any channel estimation or CSI feedback, thereby making BiT less sensitive to the orthogonality of training sequences. A more detailed discussion of BiT is presented in co-assigned patent application entitled "System and Method for Communications System Training," application Ser. No. 15/983,692, filed May 18, 2018, which is hereby incorporated herein by reference in its entirety.

Figure 3:
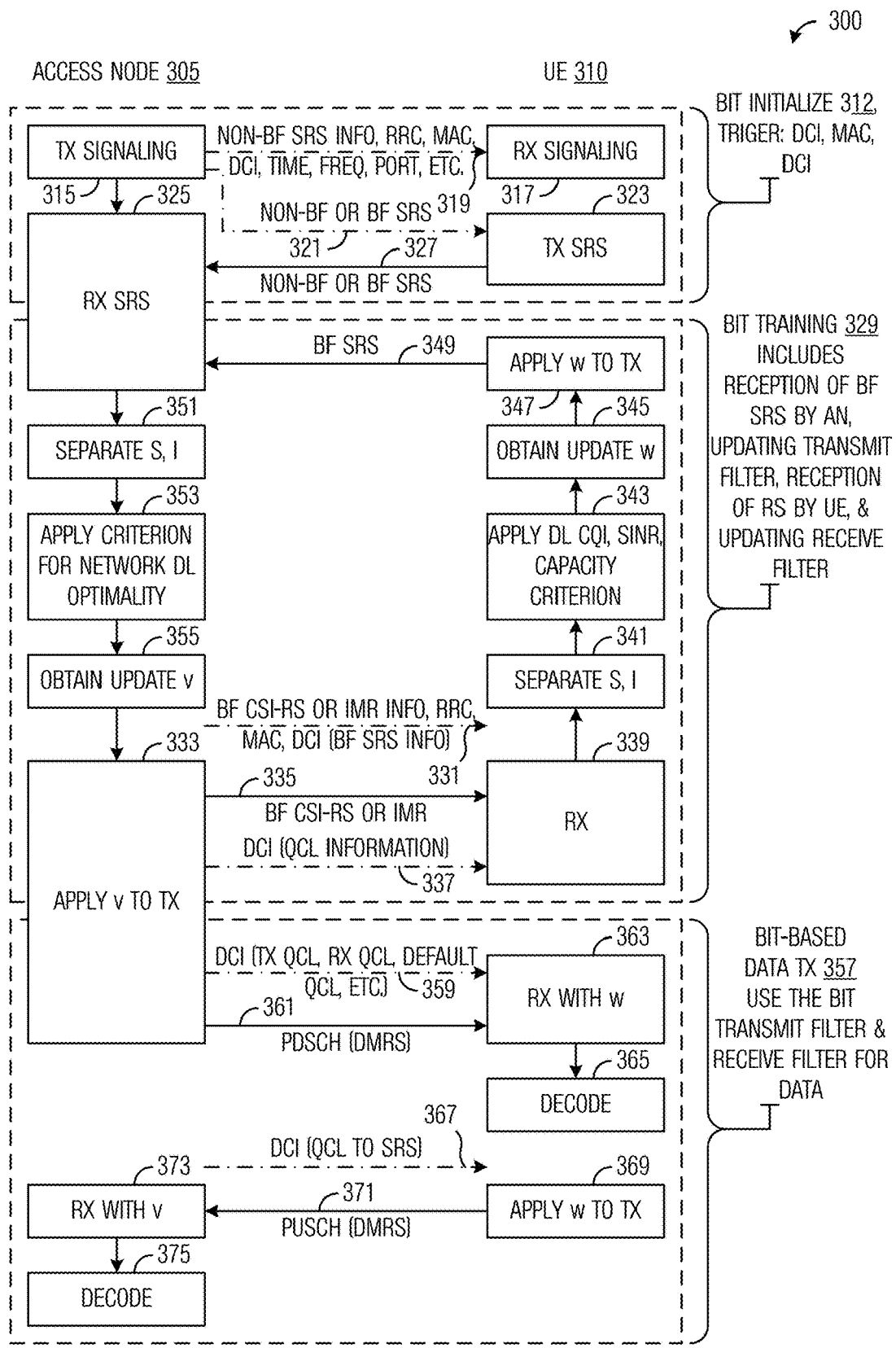
FIG. 3 is a diagram highlighting the signaling exchanged and the processing performed by devices performing bi-directional training (BiT) and BiT-based transmission.

FIG. 3 is a diagram 300 highlighting the signaling exchanged and the processing performed by devices performing BiT and BiT-based transmission. Diagram 300 displays example signaling exchanged and processing performed by an access node 305 and a UE 310 performing BiT and BiT-based transmission.

BiT begins with a BiT initialization stage 312. BiT initialization stage 312 may include access node 305 transmitting signaling configuration information (block 315) to UE 310 and UE 310 receiving configuration information (block 317). The configuration information may include non-beamformed SRS information that informs UE 310 about time, frequency, or port resources allocated to UE 310 to transmit non-beamformed SRSs. The configuration information may also include other information. The configuration information may be sent to UE 310 using RRC, MAC, or DCI messaging. The configuration information may also include information about which form of SRS UE 310 should transmit, either non-beamformed SRS or beamformed SRS, for example. Access node 305 also transmits a precoded RS as part of the signaling. UE 310 transmits SRSs to access node 305 (blocks 323 and 325). UE 310 transmits either non-beamformed SRS or beamformed SRS (event 327), as specified by access node 305, for example. This stage does not need to be dedicated solely for BiT. This stage may be adopted for non-BiT oriented sounding. This stage may be configured for purposes other than BiT and run for some time (which may be specified or until a criterion is met, for example), and the network determines when to start BiT based on this stage. Even after the BiT is done with initialization and is performing iterations, this stage of sounding may still be performed for other purposes, such as for beam refinement purposes.

BiT initialization stage 312 may include BiT configuration and triggering the BiT process. The signaling of the BiT configuration may be performed using RRC, MAC, or DCI signaling. As an example, a dedicated bit or bits in DCI is used to trigger the BiT process in periodic, semi-persistent, or aperiodic mode with RRC higher layer configuration. As another example, a new RRC configured transmission mode is used to trigger the BiT process. As yet another example, a new MAC state is first configured by RRC and then activated by MAC signaling to trigger the BiT process. As yet another example, RRC signaling is used to configure the BiT process in periodic, semi-persistent, or aperiodic mode. As yet another example, access node 305 may not explicitly trigger the BiT process, but the BiT process is implicitly triggered following an initial coarse beamforming stage, for example. In such as case, BiT is used to further refine the beams that have been found using the stage prior to the BiT. As yet another example, the access node configures or specifies (via RRC, MAC, or DCI signaling) that a UE behavior is to be expected, and the UE performs the expected behavior. The expected UE behavior may be BiT training operation to be done by the UE, and by specifying so, the BiT training process effectively starts. The expected UE behavior may include one or more steps corresponding to 339, 341, 343, 345, 347, and 349, and will be further discussed later.

BiT training 329 is a stage of the BiT process. In BiT training 329, precoded downlink signals and precoded uplink signals are transmitted by access node 305 and UE 310, respectively, to allow for the device receiving the precoded signals to update their respective receive filters and then the transmission precoding filter, or update the transmission precoding filter directly. BiT training 329 may be an iterative process that continues until an end criterion is met, or when a signaling (RRC, MAC, or DCI) is received to specify stopping BiT or to specify a process different than BiT starts. BiT training 329 may occur in parallel with data transmissions. As an example, data transmission may commence after transmit and receive filters have been determined, even before they have been refined through successive iterations of BiT training 329. Examples of end criterion include a signal plus interference to noise ratio (SINR) meets a specified criterion (such as SINR change from last iteration is smaller than a threshold (e.g., 0.2 dB), SINR has reached a certain threshold (e.g., >10 dB which can already support relatively high rate)), a number of times the precoded downlink and uplink signals have been transmitted, and so on. As an example, BiT training 329 is not stopped to enable a tracking of channel changes by the transmit and receive filters. As yet another example, BiT training 329 is discontinued and the tracking of the channel changes is also discontinued.

An initial iteration of BiT training 329 includes access node 305 signaling information about resources associated with signal reception (which are referred to herein as channel measurement resources (CMRs)) or information about resources associated with interference transmission (which are referred to herein as interference measurement resources (IMRs)) to UE 310 (event 331). In other words, the UE is configured by the access nodes with resources for channel measurement (or signal reception) and interference measurement. CMRs may be precoded downlink RSs, such as NZP CSI-RS, that are used by UE 310 to make measurements of the signals transmitted by access node 305 to UE 310 or channels between access node 305 and UE 310, and find best receive beams or generally, properties of the received signals to update UE UL precoder. Downlink signals are not limited to CSI-RS, may also include data (in physical downlink shared channels (PDSCHs)), DMRS for data PDSCH, other examples of signals are mentioned below. In some sense, the CMRs are not CMRs for channel measurement or estimation in the traditional sense, instead, the CMRs are just time or frequency resources on which the UE is configured to receive some or all layers of intended signals to be utilized for a subsequent step of the BiT process. Channel estimation may not be performed on these CMRs. Each port of the CMR is assumed by the UE as a layer of an intended signal. The UE does not need to extract the intended signal such as by sequence detection (though it may do so), instead the UE utilizes the intended signal(s) received on the resources to compute or derive a receive combiner or a transmit precoder.

IMRs are typically for signal transmissions from an access node to other UEs and may be used by UE 310 to find best receive beams, for example. In another embodiment, the IMRs are resources on which the UE processes the received transmission(s) to refine the receive beams found by considering the received signal without interference. IMRs may also be used to measure interference. In some sense, the IMRs are not IMRs for interference measurement in the traditional sense, instead the IMRs are just time or frequency resources on which the UE is configured to see or receive some or all layers of interfering signals to be utilized for a subsequent step of the BiT process. The UE does not need to extract the interfering signal (though it may do so), instead the UE utilizes the interfering signal(s) received on the resources to compute or derive a receive combiner or a transmit precoder.

FIG. 4A illustrates example resources 400 highlighting CMRs and IMRs. Resources 400 include downlink resources allocated for channel measurement, such as resources 405 and 407, and resources allocated for interference measurement, such as resources 410 and 412. The resources allocated for channel measurement are conveying NZP-CSI RS and the resources allocated for interference measurement are conveying ZP-CSI RS, for example. FIG. 4B illustrates example relationships 450 between CMRs and IMRs and resource elements of orthogonal frequency division multiplexed (OFDM) symbols or physical resource blocks (PRBs). NZP CMRs 455 and 457 may occupy all resource elements of the OFDM symbols or PRBs, or only a subset of it, such as shown in relationship 459. ZP IMRs 465 and 467 may occupy all resource elements of the OFDM symbols or PRBs, or only a subset of it, such as shown in relationship 469. The CMRs and IMRs may overlap.

As an example, the UE correlates the received signal (including intended signal, interfering signal, and noise) with a sequence representing the intended signal for a layer to derive a receive combiner for the layer, wherein the sequence may be generated from a scrambling ID associated with the transmitted signal and the scrambling ID has been configured for the UE for the associated CSI-RS or DMRS resources, for example. As another example, the UE correlates the received signal (including intended signal, interfering signal, and noise) with a sequence representing the intended signal for a layer and also determines a SINR indicator (which reflects the post-combining per-layer SINR, or an indicator that implicitly implies the SINR indicator or computes directly a function of the SINR indicator for the layer used to weight the precoder) for the layer to derive a receive combiner or a transmit precoder for the layer, wherein the SINR indicator is obtained by assuming the intended signal is the signal on the CMR(s) and represented by the sequence, and assuming that the interfering signal(s) is the interference signal on the IMR(s), and wherein the receive combiner or a transmit precoder for the layer is weighted by a function of the SINR indicator for the layer. Example CMR resources include NZP CSI-RS resources configured for channel and interference measurement, NZP CSI-RS resources configured for channel measurement, DMRS resources, PDSCH resources, and so on. Example IMR resources include NZP CSI-RS resources configured for channel and interference measurement, NZP CSI-RS resources configured for channel measurement, NZP CSI-RS resources configured for interference measurement, zero-power (ZP) CSI-RS resources configured for interference measurement, CSI interference measurement resources, DMRS resources, a new DL RS or RS resource, PDSCH resources, and so on. Access node 305 coordinates with other access nodes (especially those in close proximity to access node 305) to determine CMRs and IMRs. The CMR information or IMR information provides UE 310 information about the CMRs or IMRs transmitted by access node 305, such as time, frequency, or port resource information. The CMR information or IMR information may be signaled to UE 310 using RRC, MAC, or DCI messaging. The CMR information or IMR information may also be included with the beamformed SRS information signaled by access node 305 in event 319.

Access node 305 applies transmit filter v to a downlink signal, such as a downlink RS (block 333) and transmits the precoded downlink signal to UE 310 (event 335). The transmission comprises the signals transmitted on one or more transmission ports, on the dedicated configured resources and each transmission port corresponds to a transmission layer, and a number of transmission layers of the first transmission corresponds to a rank of the transmission.

The UE also receives interference on interference resources associated with interference resources. These interference resources may or may not overlap with channel measurement resources. The UE finds the receive filter w in accordance with the downlink signal transmission and the received interference. In other words, the receive filter w of the UE is found in accordance with the received transmission and the received interference on resources associated with signal reception and interference transmission. As an example, when the uplink precoder is an analog combiner, the analog beams in the downlink are chosen in accordance with the measured downlink signal and interference which may or may not be different from the beam chosen in accordance with the measured downlink signal only.

Access node 305 signals quasi-co-located (QCL) information to UE 310 (event 337). The QCL information specifies a relationship between two or more reference signals or data signals (e.g., CMRs and IMRs) such that the two signals may be viewed as possessing similar characteristics. As an example, in a one-to-one QCL relationship, a receive beam for CMRs and a receive beam for IMRs are the same. It is also possible that multiple signals are associated with a single signal. The UE may assume that the antenna ports for a signal are quasi co-located with the antenna ports of another signal with respect to Doppler shift, Doppler spread, average delay, delay spread, spatial Rx parameters, and so on, where applicable. Information related the quasi co-location types may be conveyed to the UE using a higher layer parameter QCL-Type, for example. Example types of the parameter QCL-Type may include (It is noted that the parameter may include a combination of the example types listed below):

QCL-TypeA': {Doppler shift, Doppler spread, average delay, delay spread},
QCL-TypeB': {Doppler shift, Doppler spread},
QCL-TypeC': {average delay, Doppler shift},
QCL-TypeD': {Spatial Rx parameter}.

A QCL relationship may signaled to a UE to inform the UE that the same receive beam may be used for CMRs and IMRs, for example. As an example, the QCL information may be signaled in DCI messaging. The DCI messaging may include information about a CMR with aperiodic RSs (such as CSI-RS, for example) and triggering, as well as, IMRs with aperiodic IMR triggering. Joint or separate DCI messaging may be used to provide information for different resources. As an example, the UE assumes that the CMR resource(s) (e.g., CSI-RSs) for channel measurement and IMR resource(s) (e.g., CSI for interference measurement (CSI-IM) or NZP resources) have QCL relationships, e.g., the CMR resource(s) and the IMR(s) have a spatial QCL relationship TypeD (i.e., QCL-TypeD'). As another example, the UE utilizes the QCL relationship between the CMR and IMR to derive CQI. The availability of the QCL relationship between CMR and IMR implies that the same receive beam is usable for both CMR and IMR reception. As yet another example, the QCL relationship is not utilized. For example, in a UE with full digital processing capability, the UE receives the CMR and IMR, and jointly determines the receive beam that is applied to both the signal reception and interference reception. In a situation with overlapped CMR and IMR, the UE may be configured with only CMR for the BiT process but a QCL-TypeD' relation is specified for the CMR, then the UE interprets that the CMR is configured with overlapped CMR and IMR.

UE 310 receives the precoded downlink signal using receive filter w (block 339). The UE does not need to be aware of whether the signal is precoded or not. The UE handles the signal in a similar manner, independent of precoding. The precoded downlink signal includes CMRs (e.g., the downlink RS) and may include IMRs. When UE 310 receives the precoded downlink signal, UE 310 is expecting to receive both the downlink signal and the associated interference. In such a situation, the QCL relationships cover not only the downlink signal but also the interference. For a reception of unicast downlink data channels based on BiT training (e.g., block 337), spatial QCL relationships are supported between a joint downlink RS with interference and DMRS antenna port(s) of the downlink data channel, with the information regarding the RS antenna port(s) being sent using DCI messages. As an example, UE 310 separates the downlink signal (s) and the interference (i) from the received precoded downlink signal (block 341). In an embodiment, UE 310 removes the downlink signal s (which is known to UE 310) leaving the interference i. UE 310 may make use of interference cancellation receiver capabilities, for example. UE 310 applies an optimization technique to find an update for the receive filter w (blocks 343 and 345). In other words, UE 310 derives an updated receive filter w. UE 310 may also compute or determine the receive filter w. As an example, UE 310 uses the optimization technique to maximize a downlink CQI, a SINR of the communications system, a channel capacity, a probability of error, or so on, to update the receive filter w, and some embodiments have been discussed above (such as those based on some global utility) and can be combined here. As an example, UE 310 does not use interference cancellation receiver capabilities (or UE 310 is not interference cancellation capable). For example, if UE 310 uses interference cancellation receiver capabilities for data reception, then UE 310 determines the receive filter w using similar assumptions. In this situation, UE 310 receives and estimates the downlink signal s and the interference i, then UE 310 derives the receive filter w, as well as resulting CQI, SINR, channel capability, probability of error, and so on. The receive filter w (or an equivalent version thereof) is also used as transmit filter, also denoted w. As discussed previously, the two filters are equivalent when they are conjugate transposed versions of each other, conjugated versions of each other, scaled versions of each other, normalized versions of each other, or are identical to each other. In a multi-transmission layer deployment, the two filters may be weighted versions of each other, with potentially different weights for each transmission layer. As an example, UE 310 does not derive the receiver filter w but directly derives the transmit filter w. This direct derivation of the transmit filter w can be done for the BiT iterations involving only training but no DL data transmission. That is, the derivation of the receiver filter is needed only for DL data transmission but not necessary for BiT training. The expected UE behavior as specified by the access node configuration or indication for the UE may be only the derivation of the transmit filter w based on the associated CMR and optional IMR. Other UE behavior such as an intermediate step of deriving a hypothetical receive filter w based on the associated CMR and optional IMR and then obtaining the equivalent transmit filter may be done by the UE as part of the UE implementation but the network configuration or standard specifications do not need to specify those.

UE 310 applies the transmit filter w to an uplink signal, such as an uplink RS (block 347). The uplink RS may be SRSs, DMRSs, or any other RS, for example. In an embodiment, the uplink RS may be UL data that can be decoded correctly by access node 305. UE 310 transmits the precoded uplink signal to access node 305 (event 349). This step may be combined with the previous step of deriving or updating the transmit filter w, and the expected UE behavior as specified by the access node configuration or indication for the UE may include the transmission of the uplink RS in accordance with the associated CMR and optional IMR. Access node 305 receives the precoded uplink signal using receive filter v (block 325). The access node does not need to be aware of whether the signal is precoded or not. Access node 305 separates the uplink signal (s) and the interference (i) from the received precoded uplink signal (block 351). Access node 305 applies an optimization technique to find an update for the receive filter v (blocks 353 and 355). In other words, access node 305 derives an updated receive filter v. Access node 305 may also compute or determine the receive filter v. As an example, access node 305 uses the optimization technique to optimize overall communications system downlink performance, and some other embodiments have been provided above and can be combined here. Access node 305 may use the same optimization technique used by UE 310, for example. The second transmission is transmitted on one or more second transmission ports. As an example, the first number of transmission layers of the first transmission and a second number of transmission layers of the second transmission are the same. As discussed previously, the two corresponding filters are equivalent when they are conjugate transposed versions of each other, conjugated versions of each other, scaled versions of each other, normalized versions of each other, or are identical to each other. As another example, the number of transmission in the second transmission is different than the number of transmission layers in the first transmission. The access node signals updates the UE with the number of transmission layers in subsequent transmissions. As yet another example, the access node does not derive the receiver filter v but directly derives the transmit filter v. This can be done for the BiT iterations involving only training but no UL data transmission based on BiT. That is, the derivation of the receiver filter is needed only for UL data transmission based on BiT but not necessary for BiT training.

FIG. 5 illustrates a flow diagram of example operations 550 occurring in a UE supporting BiT training. Multiple steps are described here, and each step may have multiple embodiments. Furthermore, the embodiments can be combined. Operations 550 begin with the UE receiving a first transmission in downlink (block 555). The first transmission in the downlink may be sent from one or more access nodes. The first transmission may include a first signal on one or more resources associated with signal reception that has been previously configured or indicated to the UE. The first signal may be sent from one or more access nodes serving the UE, and the first signal may include one or more layers. The first signal may be a RS, such as a NZP CSI-RS or DMRS for a downlink transmission, or a new or enhanced DL RS with one or multiple ports, each port corresponding to one transmission layer. The total number of ports or layers is informed to the UE via control signaling (such as CSI-RS configuration signaling or a MAC signaling or a DCI or joint from RRC signaling), MAC signaling, and DCI. The total number of ports or layers is the rank of the first signal. Associated with the first signal may be a first interference, that is, the first downlink transmission containing the first signal may be interfered by other transmissions. The interference may be seen on the resources associated with interference reception for the first transmission that has been previously configured or indicated to the UE, which may be the same as the resources associated with the signal reception or different. The association between the first signal and the interference may be configured by RRC signaling, activated by MAC signaling, indicated by DCI signaling, or by default if the interference reception resource(s) is the same as the signal reception resource(s). The first interference may be an aggregation of multiple other transmissions, including inter-cell and intra-cell interference intended for other UEs. Some part of the interference may be signaled with port information, and UE assumes each port corresponds to an interference transmission layer and takes into account the associated energy per resource element (EPRE) ratios configured or indicated to the UE. Other interference signals are not signaled with port information, and UE assumes these interference signals are present on all signaled interference resources, for example.

The UE derives a transmission precoder for uplink transmission (block 557). The derivation is based on UE assumptions specified for this procedure, which may be defined in a standard specification or associated with a signaling associated with the first downlink transmission. The UE assumptions include that the UE assumes a downlink transmission (e.g., a hypothetical PDSCH, or a PDSCH associated with the first transmission occurring at a later time that is known to the UE) of intended signal with rank equal to the first downlink signal, and interference corresponds to the first interference, and a receiver (may be a hypothetical receiver, a receiver assumed by the UE for deriving the UL precoding, a receiver to be used for receiving the associated PDSCH at a later time, or a receiver to be used for deriving CSI measurement for the associated PDSCH at a later time, for example) with a receive combiner equivalent to the uplink precoder. In other words, the uplink precoder reflects the downlink receive combiner (or vice versa), and hence, the uplink precoded transmission based on the precoder reflects the downlink signal or channel quality in the combined direction, interference condition in the combined direction, and UE capability of processing the signal and avoid, suppress, or cancel the interference if any. The uplink transmission then can carry the information to the access node so that the access node can adapt accordingly, such as link adaption of MCS, rank, or beamforming adaptation. The uplink rank is equal to the downlink rank, and the uplink layers and downlink layers have a one-to-one mapping. The power allocation of the uplink layers may not be uniform, such as associated with a post-combing downlink SINR for each downlink layer with the receive combiner.

The UE sends the uplink signal precoded with the precoder and associated power allocation (block 559). The uplink signal may be a SRS on a SRS resource or SRS resource set(s), or a DMRS. The UE may also send the post-combing downlink SINR for each downlink layer with the receive combiner. In some cases, the UE may also perform CSI measurement based on the first transmission and send CSI reporting information with the same receiver assumptions and CSI assumptions as the uplink signal, such as when specified by the access node and it may be used for link adaptation for the associated PDSCH at a later time. The UE procedure ends. However the access node may instruct the UE to perform the steps continuously or once in a while with a specified periodicity or based on an aperiodic signaling.

Apparatus and methods for dynamically or semi-persistently signaling information for SRS transmission are presented in co-assigned U.S. patent application entitled "Device, Network, and Method for Sounding Reference Signal Transmission and Reception," application No. 62/800,336, filed Feb. 1, 2019, which is hereby incorporated herein by reference in its entirety.

The signaling of the information for SRS transmission instructs a UE to transmit SRSs according to the signaled information, instead of the semi-dynamically configured SRS parameters. In this way, the apparatus and methods adjust SRS parameters to be used by the UE for SRS transmission. The apparatus and methods enable flexible SRS transmissions based on the dynamically or semi-persistently signaled SRS parameters. SRS resources transmitted based on such signaled SRS parameters may reflect channel interference situations, channel conditions and precoding more properly and timely, and thus improve channel estimation performance.

The dynamically signaled information may include information about one or more SRS parameters, such as a SRS bandwidth, antenna ports, frequency hopping, antenna or carrier switching within a signaled SRS bandwidth, SRS resources to be transmitted, precoding based on measurements of downlink signal and interference, SRS transmission power within a signaled SRS bandwidth, related RRC configuration, or any other information for SRS transmission. The information about the antenna ports may specify a number (quantity) of the antenna ports, or a subset of the configured antenna ports, e.g., in terms of resource mapping and multiplexing. For example, ports mapped to SRS resources to be transmitted may be signaled or indicated. A mapping between the dynamically signaled SRS ports and the SRS resources (including RE/sequences, CS/comb mapping) may be predefined. DL RS ports corresponding to the signaled ports may also be signaled for the UE to perform measurements to derive precoding for transmission of a SRS on the signaled ports. The information dynamically signaled may also be generally referred to as SRS parameters in the following description. The terms of "antenna port" and "port" are used interchangeably in the disclosure.

FIG. 6 illustrates a diagram of an example method 60o for SRS communication. In this example, an access node 602 semi-statically configures SRS transmission for a UE 604 and dynamically indicates SRS parameters to UE 604, and UE 604 transmits SRSs based on the configuration and indication. At step 612, access node 602 semi-statically configures UE 604 for SRS transmission. For example, access node 602 may semi-statically configure, for UE 604, multiple SRS resource sets, e.g., per bandwidth part (BWP), associated with different set of SRS parameters, including e.g., SRS bandwidth, numbers of port, cyclic shift, transmission comb, or other SRS parameters as specified by 3GPP TS 38.214 V15.3.0 (2018-09), which is hereby incorporated herein by reference in its entirety. For each of the multiple SRS resource sets, a DL CSI-RS resource (together with a corresponding bandwidth and number of ports) may be configured for spatial relation with a corresponding SRS resource set, in order to derive proper precoding (e.g., the transmit filterer w as illustrated in FIG. 2) at the UE 604.

Access node 602 may semi-statically configure one or more SRS resource sets for UE 604. For example, access node 602 may semi-statically signal SRS parameters associated with each SRS resource set to UE 604 using RRC signaling. One of the SRS resource sets may be selected and triggered by access node 602, which will be sent by UE 604.

After step 312, access node 602 may, at step 614, dynamically indicate or signal one or more SRS parameters to UE 604. For illustration simplicity, a SRS parameter configured at step 612 may be generally referred to as a configured SRS parameter, and a SRS parameter signaled at step 614 may be generally referred to as an indicated SRS parameter. By use of step 614, access node 602 further requests that UE 604 transmits a triggered SRS resource set based on the SRS parameters specifically indicated or signaled at step 614. The one or more SRS parameters may include a SRS transmission bandwidth which may be a subset of a configured SRS bandwidth of the triggered SRS resource set. For example, a subset of resource blocks (RBs, or physical RBs (PRBs)), in a set of RBs that has been configured semi-dynamically (e.g., at step 612) using higher layer signaling (via the parameters of SRS bandwidth configuration C_SRS and SRS bandwidth B_SRS), may be dynamically indicated by access node 602 to UE 604. Although the descriptions are mainly based on RBs, the same may be done for subbands, RB groups (RBGs), sub-channels, frequency-domain bundles, or other types of frequency units. The one or more SRS parameters may include antenna ports, which may be a subset of ports in a set of ports that has been configured semi-dynamically using higher layer signaling (e.g., at step 612). For example, the semi-statically configured antenna ports include ports 1-4, and a subset of the ports 1-4, e.g., port 1 and port 3, may be dynamically signaled for UE 604 to transmit SRSs using port 1 and port 3.

Access node 602 may dynamically signal the one or more SRS parameters at step 614 using a DCI message, a medium access control (MAC) control element (CE), or other applicable control messages. In one example, a new DCI format dedicated for dynamically or semi-persistently signaling SRS parameters and triggering SRS transmission may be defined. The new DCI format may also include a field for CSI-RS triggering. In another example, DCI formats used for PDSCH or PUSCH scheduling, or the group DCI format may be modified and used for dynamically signaling SRS parameters. In this case, the resource assignment filed of a DCI format may be used to dynamically indicate a SRS bandwidth to be used for SRS transmission. In another example, a new MAC CE may be defined to include one or more SRS parameters to be dynamically indicated.

At step 616, UE 604 may, based on the semi-dynamic SRS configuration (at step 612) and the dynamic indication (at step 614), transmit a triggered SRS resource set. One of the SRS resource sets configured at step 612 may be selected and triggered by the access node 602 to be transmitted by UE 604. As an example, a DCI message may be used to signal the one or more SRS parameters at step 614 and also trigger UE 604 to transmit a SRS resource set (i.e., a triggered SRS resource set) as configured at step 612. As an illustrative example, the triggered SRS resource set is associated with a RB set (including a set of RBs) as SRS bandwidth and a port set (including a set of ports) as SRS antenna ports, over which SRSs are to be transmitted, and the DCI message sent at step 614 includes a subset of RBs in the RB set and a subset of ports in the port set. In this case, UE 604 may transmit the triggered SRS resource set according to the subset of RBs and the subset of ports. Other SRS parameters, such as transmission comb, transmission comb offset, SRS sequence ID, etc., associated with the triggered SRS resource set and have been configured at step 612, may still be used by UE 604 in transmitting the triggered SRS resource set, if they are not changed or adjusted by access node 602 using any signaling. The dynamic signaling of the SRS parameters, in this case, may be viewed as to adjust or change values of the similar SRS parameters that have previously been configured semi-dynamically, and the adjusted values will be used for SRS transmission by UE 604.

UE 604 may derive the precoder for transmitting the triggered SRS resource set based on one or more DL RS resource(s) (i.e., DL RS signal(s)) that are configured for channel and interference measurements of an indicated SRS transmission bandwidth, which may be a subband of a transmission bandwidth between UE 604 and access node 602, or the entire transmission bandwidth. For example, a subband precoding for SRS transmission in the subband may be applied when a precoder of the subband can be derived based on a DL RS resource that is configured for channel and for interference measurements of the subband. In another example, wideband precoding for SRS transmission in the entire transmission bandwidth may be applied when a wideband precoder can be derived based on a DL RS resource configured for channel and for interference measurements of the transmission bandwidth. The transmission bandwidth between UE 604 and access node 602 may be semi-statically configured by the base station, and the subband may by dynamically indicated by access node 602 to UE 604. UE 604 derives the precoder for the indicated subband, precodes a SRS with the precoder, and sends the precoded SRS. When no subband is indicated by access node 602 dynamically, UE 604 will derive a wideband precoder to precode the SRS and sends the precoded SRS. In any of the cases where subband precoding or wideband precoding is used, the number of transmission layers, and/or transmission ports may also be indicated, e.g., using DCI or MAC CE, or configured using RRC, by access node 602 to UE 604. UE 604 may derive a transmission power for SRSs according to the dynamically indicated SRS transmission bandwidth instead of the semi-statically configured SRS transmission bandwidth.

A DCI message may be sent before step 614 and after step 612 to trigger UE 604 to transmit a SRS resource set (i.e., a trigger SRS resource set). In this case, UE 604, upon receipt of the DCI message, may transmit the SRS resource set according to SRS parameters associated with the triggered SRS resource set that has been configured by access node 602 at step 612, such as the RB set and the port set.

As an example, after the UE receives a message to overwrite certain SRS configurations configured by a previous RRC signaling, the UE will use the new SRS configurations/parameters according to the message from now on, until it receives another RRC signaling or another message to further overwrite the SRS configurations/parameters. In other words, the configurations/parameters in the message apply until further changed. As another example, after the UE receives a message to overwrite certain SRS configurations configured by a previous RRC signaling, the UE will use the new SRS configurations/parameters according to the message for one transmission, and after that, it reverts to the "normal state" of SRS configurations/parameters in accordance with the original RRC signaling. In other words, the configurations/parameters in the message apply for one shot only. As yet another example, after the UE receives a message to overwrite certain SRS configurations configured by a previous RRC signaling, the UE will use the new SRS configurations/parameters according to the message for n transmissions or m slots, and after that it reverts to the "normal state" of SRS configurations/parameters in accordance with the original RRC signaling. Here, the n transmissions or m slots may be specified by a standard specification, in a RRC configuration signaling, in a MAC signaling, a DCI, or in general a message (or the message). As yet another example, the message includes a bit to indicate if the new SRS configurations/parameters in the message are for one-shot use and revert or for use from now on.

As an example, a new DCI format may be defined, which may be dedicated for dynamically signaling SRS parameters and/or triggering SRS transmission. The new DCI format may include fields to indicate a SRS transmission bandwidth (which may include a subset of a bandwidth that has been configured using higher layer signaling), SRS transmission ports (which may include a subset of ports that have been configured using higher layer signaling), SRS transmission power, or other SRS parameters that may be dynamically signaled to UEs for SRS transmission. Table 1 below shows an example of the new DCI format including a portion of fields it may have. Fields for dynamically indicating other SRS parameter, such as cyclic shift, SRS sequence Id, etc., may also be added.

TABLE 1

| Field |
| --- |
| SRS request |
| Frequency domain resource assignment |
| Antenna ports |
| TPC command |

Table 1 shows four fields including "SRS request", "frequency domain resource assignment", "antenna ports" and "TPC command". The "SRS request" field is used to trigger transmission of a SRS resource set. This field may have various lengths, e.g., 1 bit or 2 bits. Accordingly, different number of SRS resource sets may be selected and triggered via this field. The "frequency domain resource assignment" field may be defined similarly to the "frequency domain resource assignment" field used for PUSCH/PDSCH frequency domain resource assignment in existing DCI format, as specified by 3GPP TS 38.211 V15.3.0 (2018-09), which is hereby incorporated herein by reference in its entirety. However, the frequency domain resource specified by this field needs to fall within a SRS bandwidth configured using higher layer signaling for SRS resource set(s). For example, this field may specify a subset of a SRS bandwidth that has been configured using higher layer signaling for a SRS resource set. The "antenna ports" field may be used to specify antenna ports for SRS transmission (as well as the DL RS ports for deriving a SRS precoder). For each SRS port, there may be a DL RS port configured for a UE to derive SRS port precoding. In such a case, the DL RS port is associated with the SRS port, and may be indicated in the same field as the SRS port. The "antenna ports" field may specify a subset of the ports semi-statically configured using higher layer signaling. The "TPC command" field may specify a transmit power control command, based on which SRS transmission power may be adjusted.

To differentiate this new DCI format from other DCI formats, a new radio network temporary identifier (RNTI) may be configured for the new DCI format. The new DCI format may have cyclic redundancy check (CRC) scrambled by the new RNTI. A UE may recognize the new DCI format by use of the new RNTI.

In one example, this new DCI format may be used to dynamically trigger SRS transmission while indicating a SRS transmission bandwidth and ports. In another example, the new DCI format may be used only for semi-persistently adjusting a SRS transmission bandwidth and ports without triggering the SRS transmission. In this case, a different DCI format may then be used (e.g., transmitted after the semi-persistent adjustment) to dynamically trigger the SRS transmission without further changing the SRS transmission bandwidth and ports. In yet another example, the new DCI format may be used for semi-persistently adjusting a SRS transmission bandwidth and ports while triggering the SRS transmission. In this case, a different DCI format may also be used (e.g., transmitted after the new DCI format message is sent for semi-persistent adjustment) to dynamically trigger the SRS transmission without adjusting the SRS transmission bandwidth and ports but applying the adjusted transmission bandwidth and ports.

As an example, the existing DCI format 2_3, for transmission of a group of TPC commands for SRS transmissions by one or more UEs as specified by 3GPP TS38.212 V15.3.0 (2018-09), or variations of the DCI format 2_3, may be modified for dynamically indicating SRS parameters to UEs. The existing DCI format 2_3 includes a SRS request field and a TPC command field for each block, as specified by 3GPP TS 38.212 V15.3.0 (2018-09).

As an example, for each SRS request block of the DCI format 23, field(s) may be added to indicate its corresponding SRS transmission bandwidth (which includes a subset of a bandwidth configured using higher layer signaling), SRS transmission ports (which include a subset of configured ports using higher layer signaling), or other SRS parameters that may be dynamically adjusted. Table 2 below shows an example of the modified DCI format 2_3 including a portion of fields it may have for one SRS request block.

TABLE 2

| Field |
| --- |
| SRS request |
| Frequency domain resource assignment |
| Antenna ports |
| TPC command |

Table 2 shows four fields including "SRS request", "frequency domain resource assignment", "antenna ports" and "TPC command". Table 2 is similar to Table 1. However, the fields of "frequency domain resource assignment" and "antenna ports" are added to the DCI format 2_3. The "SRS request" field is similar as that of the DCI format 2_3 TypeB, and has the same value, i.e., 0 or 2 bits. It is used to trigger transmission of a SRS resource set. More than 2 bits may be used to trigger transmission of a SRS resource set selected from a large number of SRS resource sets. The "frequency domain resource assignment" field is added, and may be defined similarly to the "frequency domain resource assignment" field used for PUSCH/PDSCH frequency domain resource assignment in existing DCI format, as specified by 3GPP TS 38.211 V15.3.0 (2018-09). However, the frequency domain resource assignment by this field needs to fall within the bandwidth configured using higher layer signaling for SRS resource set(s). The "antenna ports" field is added and used to specify antenna ports for SRS transmission (as well as the DL RS ports for deriving a SRS precoder). The "antenna ports" field may specify a subset of the ports that have been semi-statically configured using higher layer signaling. The "TPC command" field is the same as that of the DCI format 2_3 TypeB. It includes a transmit power control command, based on which transmit power for transmitting a triggered SRS resource set may be adjusted. Table 2 shows that the "frequency domain resource assignment" and the "antenna ports" are two separate fields. In another embodiment, one single field may be defined and added in the DCI format 2_3 to jointly specify the "frequency domain resource assignment" and the "antenna ports".

Figure 7:
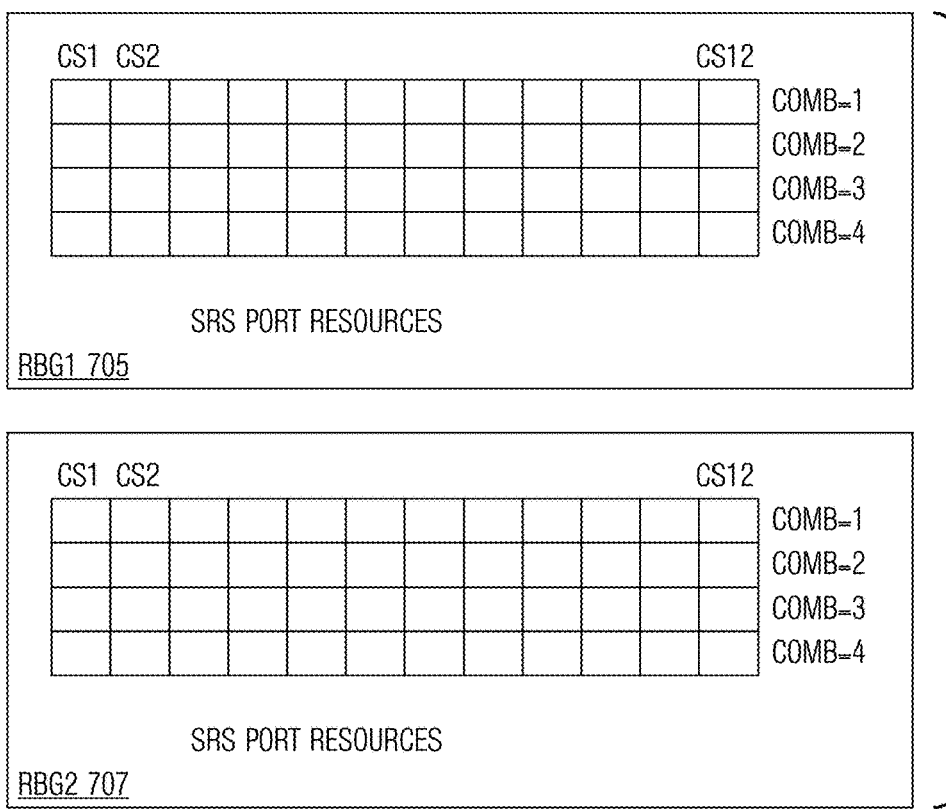
FIGS. 7 and 8 illustrate diagrams of RGBs, and example mapping of SRS resources and ports.
Figure 8:
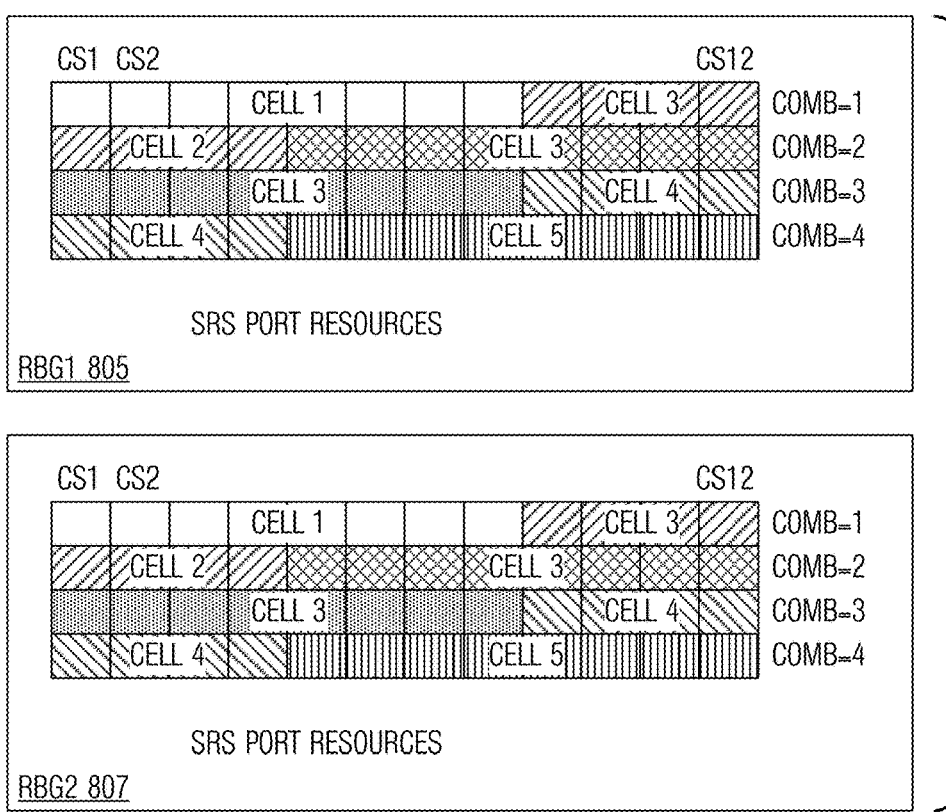

Apparatus and methods for example signaling of control information are presented in co-assigned patent application entitled "Methods and Apparatus for Signaling Control Information," Application Number PCT/US19/46,898, filed Aug. 16, 2019, which is hereby incorporated herein by reference in its entirety. FIGS. 7 and 8 illustrate diagrams 700 and 800 of RGBs 705, 707, 805, and 807, and example mapping of SRS resources and ports. Diagram 700 illustrates RGBs 705 and 707 in a communication system with the following configuration: assume DMRS type 1 (8 ports per RGB per cell for all paired UEs); in another example 12 port DMRS may be considered, and the 8 ports are associated with 8 SRS port resources, selected from n available port resources (e.g., for comb 4, n=48, and for comb 2, n=16). The SRS from neighboring cells should be multiplexed on the n SRS port resources. In order to indicate, to a UE, which 1, 2, or 4 SRS port resources out of the available n SRS port resources would require more bits than available in a DCI message.

Diagram 800 illustrates RGBs 805 and 807, with the same configuration as discussed in FIG. 7. As an example, UE-group CSI-RS or DMRS design is applied to the SRS. For each cell, there are only 8 predefined SRS port resources (shown in FIG. 8 as different shaded and pattern blocks in the SRS port resources region of the RGBs). Then, in a DCI message (such as a group DCI message), the layer or port assignments for a UE are made within the 8 predefined SRS port resources and indicated accordingly. As an example configure a SRS resource for all active UEs in cell 1 (shown as unshaded blocks in the SRS port resources region of the RGBs), and the SRS resource has the same 8 ports. The group DCI message indicates which of the 8 ports are allocated to a particular UE. As an example, rank [1, 2, 4, 1] are signaled for UEs 1, 2, 3, and 4, without needing to indicate the layer index. As another example, the DMRS port mapping of the resources are used. The SRS resource is configured for all RGBs, but the scheduling or group DCI allows different UEs to be scheduled on different RGBs.

Alternative designs to the Group DCI for signaling control information of the SRS are possible. In one embodiment, the UEs identified in a Group DCI share a resource allocation field (Type 0 or Type 1 indication). Such a case may occur in a multi-user multiple input multiple output (MU-MIMO) setting, where UEs may share resource blocks or RBGs. In this situation, preconfigured UEs which are not prescheduled have fields in the Group DCI with trigger set to zero.

In another example, the UEs identified in a Group DCI have separate fields for the indication of the resource allocation fields for each of the UEs. In this case, preconfigured UEs which are not prescheduled have fields with trigger set to zero.

In any of the preceding examples, a UE identifier may be used to identify prescheduled UEs. In this way, only prescheduled UE are able to decode the DCI. However, a UE will attempt to decode the DCI to check if it is triggered (prescheduled) or not. For example, all UEs detecting the DCI can attempt to decode the DCI.

In any of the preceding examples, the DCI includes a combination of fields listed or subset of the fields aforementioned.

In another example, a modified DCI format, such as DCI format 0_1 (UL Grant) or DCI format 1_1, may be used to dynamically configure triggered (prescheduled UEs) with the SRS parameters aforementioned and the associated downlink PDSCH and/or CSI-RS parameters.

Any of the 5G NR DCI designs may be used to signal the necessary aforementioned such as the necessary fields are added/modified to the DCI.

The discussion presented above is related to narrowband (NB) systems and operations, where the entirety of the bandwidth of a carrier operates for one BiT process. However, the systems and operations may be applied to any subband (or some other frequency unit comprising one or more physical resource blocks, for example) based on a narrowband representation of the subband's channels. In such a situation, one or more BiT processes may operate on one or more subbands across the bandwidth of the carrier. Therefore, the discussion of narrowband systems and operations should not be construed as being limiting to the scope of the previously presented systems and operations.

BiT was developed for time division duplexing (TDD) communication systems to maximize the DL weighted sum rate. However, the previous work on BiT was limited to NB systems. However, most fifth generation (5G) networks operate on carriers with large bandwidths, where a carrier contains at least hundreds of subcarriers (i.e., tones), each having a different MIMO channel matrix, and experiencing considerable frequency selectivity. Therefore there is a need to extend BiT to 5G wideband (WB) communication systems.

In a WB system, a number of subcarriers may be specified to form a resource block (RB) or physical RB (PRB). For LTE and NR, the number of subcarriers is 12. Then, a number of PRBs may be specified to form a subband, a RB Group (RBG), Precoding Resource Block Group (PRGs), frequency chunk, frequency-domain unit, bandwidth unit, or the like, for different purposes. One or more of these (e.g., subbands, RBGs, PRGs, frequency chunks, frequency-domain units, bandwidth units, etc.) form a bandwidth part (BWP) or carrier, which may be associated with a serving cell.

Aspects of the present disclosure provide BiT for 5G wideband communication systems. A global, centralized optimization problem is first formulated for a wideband communication system. The (sub-optimal) solution is then distributed across the access nodes and UEs, resulting in a wideband BiT solution that iteratively adapts communication filters (e.g., transmission and reception filters) for each access node and each UE utilizing only local information. The wideband BiT solution may be seen as a set of narrowband BiT solutions, with each operating on a suitable, narrowband representation of a group of subcarriers with different channels while maintaining the first and second moments of the channels. Simulation study results are provided to evaluate the performance of the BiT solution in a wideband communication system.

One straightforward approach to extending BiT for wideband operation is to have a BiT process for each subcarrier in the wideband communication system. However, operating the wideband communication system with one BiT process operating separately for every subcarrier (or even every few subcarriers) would be impractical, because in a single wireless carrier (channel) there are at least hundreds of subcarriers and the access node or UE may need to support one or multiple carriers. Another straightforward approach to generalizing BiT for wideband operation is to select one subcarrier within a subband, such as the center subcarrier of the subband, for example, to represent the subband, and then use narrowband BiT in accordance with the selected subcarrier. Alternatively, a simple averaging of the per-subcarrier MIMO channel matrices in the subband may be considered. Unfortunately, analysis and evaluations show that these approaches, as well as several other naive extensions to the wideband communication system, lead to substantial performance degradation. One root cause of the poor performance may be the fast rotation of the multipath phases among the subcarriers of the wideband channel. Furthermore, in some extreme cases, the mean of the channel matrices in a subband has a magnitude that is close to zero, rendering such a naive narrowband representation of the subband irrelevant. A detailed discussion of issues associated with such naive narrowband representations of the wideband channel is provided below.

According to an example embodiment, a global centralized optimization problem for a wideband communication system is provided. In an embodiment, the global centralized optimization problem assumes that ideal global channel state information (CSI) is available at the centralized location. A sub-optimal, approximate solution is obtained and analyzed. The centralized solution is further distributed across the access nodes and UEs, resulting in a distributed solution that relies on only local CSI and local decision making. In an embodiment, the distributed solution utilizes TDD channel reciprocity for the access nodes to acquire information about downlink channels and inter-/intra-cell interference.

The following wideband constraints are taken into consideration: 1.) The channels for the subcarriers are different; 2) To enable a receiver to receive and process the transmitted signals with sufficient accuracy, such as channel estimation for computing receiver and transmitter filters or for demodulation, the receiver needs to process multiple subcarriers jointly with a certain common channel assumption (a discussion of which is provided below). A narrowband representation of wideband channels is developed for this purpose.

The following notation is used: $X_{n \times m}$ is used to represent a complex matrix of dimension n×m, X' is the Hermitian transpose of X, tr(X) is the trace of X, $X_{(i)}$ is the (i, i)-th diagonal) element of X if X is diagonal, and $X_{(1:k,1:l)}$ is the top left k×l block. Furthermore, $\|X\|_F$ is the Frobenius norm for the matrix X, and $\|x\|_2$ is the vector 2-norm for the vector x. For a vector x, $\text{diag}(x)_{n \times m}$ is an n×m "diagonal" matrix with diagonal elements equal to those in x and all other elements being zero. The common notion of a matrix diagonal or a diagonal matrix for a square matrix is also extended to a non-square matrix.

Figure 9:
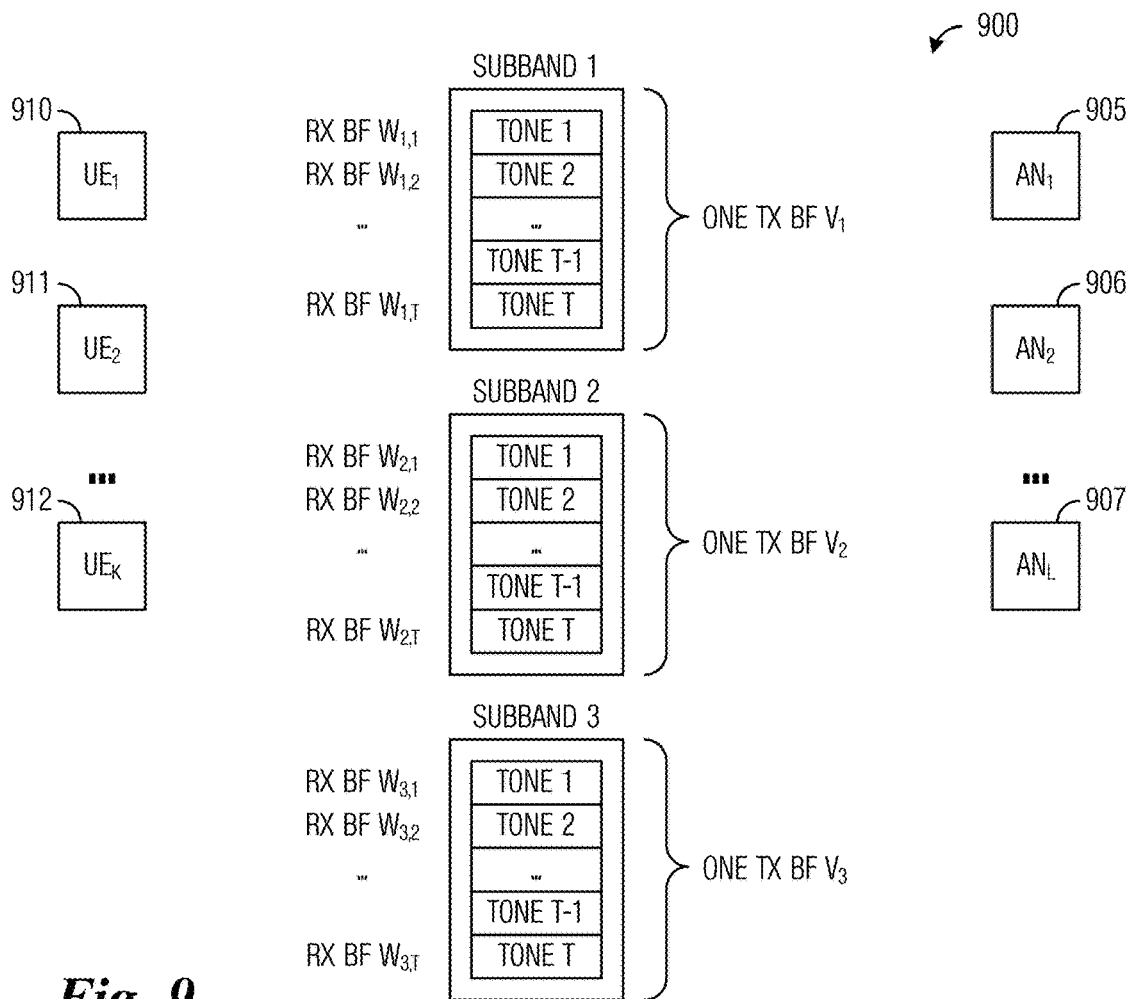
FIG. 9 illustrates an example communication system, highlighting the notation used in the discussion of the example embodiments presented herein.

FIG. 9 illustrates an example communication system 900, highlighting the notation used in the discussion of the example embodiments presented herein. Communication system 900 includes with L access nodes (including $AN_1$ 905, $AN_2$ 906, . . . , $AN_L$ 907) and K UEs (including $UE_1$ 910, $UE_2$ 911, . . . , $UE_K$ 912) paired on a group of T subcarriers which may be referred to as a subband. Each access node has N antennas and each UE has M antennas. For brevity, the access node-UE association (UE k served by BS $l_k$), UE pairing, layer selection ($d_k$ layers for UE k), and power allocation ($p_{k,d}$ for the d-th layer of UE k) are assumed to be pre-determined and fixed in the present disclosure. Only the access node precoders $\{v_{k,d}\}$ (common for all T subcarriers within a subband, for the d-th layer of UE k) and UE combiners $\{w_{k,d,t}\}$ (can be different for different subcarriers within a subband, for the d-th layer of UE k) are to be optimized.

The centralized global optimization problem is formulated as follows for one subband, and is denoted Problem F1:

$$\max_{\{v_{k,d}\},\{w_{k,d,t}\}} \sum_{k=1}^{K} \sum_{d=1}^{d_k} \sum_{t=1}^{T} \alpha_k \log(1 + \gamma_{k,d,t}),$$

$$\text{s.t. } |v_{k,d}|_2^2 = 1, \forall k, d$$

where $\alpha_k$ is the per-UE fairness weight. The per-layer per-subcarrier SINR is expressible as:

$$\gamma_{k,d,t} = \frac{p_{k,d}|w'_{k,d,t} H_{l_k,k,t} v_{k,d}|^2}{\sum_{(\kappa,\delta) \neq (k,d)} p_{\kappa,\delta}|w'_{k,d,t} H_{l_k,k,t} v_{\kappa,\delta}|^2 + \sigma^2 |w_{k,d,t}|_2^2},$$

$$= \frac{p_{k,d}|w'_{k,d,t} H_{l_k,k,t} v_{k,d}|^2}{w'_{k,d,t} C_{k,t} w_{k,d,t} - p_{k,d}|w'_{k,d,t} H_{l_k,k,t} v_{k,d}|^2},$$

where $H_{l,k,t}$ is the downlink MIMO channel of subcarrier t between access node l and UE k, and $C_{k,t}$ is the receiving covariance matrix of subcarrier t for UE k given by expression:

$$C_{k,t} = \Sigma_{K,\delta} p_{K,\delta} H_{l_K,k,t} v_{K,\delta} v'_{K,\delta} H'_{l_K,k,t} + \sigma^2 I.$$

Furthermore, let $$\beta_{k,d,t} = 1 + \gamma_{k,d,t} = \frac{w'_{k,d,t} C_{k,t} w_{k,d,t}}{w'_{k,d,t} C_{k,t} w_{k,d,t} - p_{k,d}|w'_{k,d,t} H_{l_k,k,t} v_{k,d}|^2}.$$

Then it holds that $$\frac{1}{\beta_{k,d,t}} = 1 - p_{k,d} \frac{w'_{k,d,t} H_{l_k,k,t} v_{k,d} v'_{k,d} H'_{l_k,k,t} w_{k,d,t}}{w'_{k,d,t} C_{k,t} w_{k,d,t}},$$

and therefore, the optimizing per-subcarrier per-layer UE receiving combining can be obtained as $$w_{k,d,t} = \sqrt{p_{k,d}} C_{k,t}^{-1} H_{l_k,k,t} v_{k,d}$$

based on the solution to the Rayleigh Quotient and/or generalized eigenvalue problem.

Using fractional programming techniques, the term inside the objective function of problem F1 then becomes $$\log \beta_{k,d,t} - \beta_{k,d,t} e_{k,d,t} + 1,$$

where $e_{k,d,t} = 1 - 2\sqrt{p_{k,d}} \text{Re}\{w'_{k,d,t} H_{l_k,k,t} v_{k,d}\} + w'_{k,d,t} C_{k,t} w_{k,d,t}.$ Lagrange multipliers may be applied to turn problem F1 into the following unconstrained optimization problem, denoted problem F2:

$$\max_{\{v_{k,d}\},\{\beta_{k,d,t}\}} \sum_{k=1}^{K} \left( \sum_{d=1}^{d_k} \alpha_k \left[ \sum_{t=1}^{T} \log \beta_{k,d,t} - \beta_{k,d,t} \left( 1 - 2\sqrt{p_{k,d}} \text{Re} \{w'_{k,d,t} H_{l_k,k,t} v_{k,d}\} + w'_{k,d,t} C_{k,t} w_{k,d,t} \right) \right] - \mu_{k,d}(v'_{k,d} v_{k,d} - 1) \right),$$

where $\mu_{k,d}$ is the Lagrange multiplier for access node l that will be searched to meet the power constraint.

The following optimality equations may be obtained for all k, d, t, which can be solved using coordinate block descent, for example. First for $\beta_{k,d,t}$:

$$\beta_{k,d,t} = (1 - 2\sqrt{p_{k,d}}\text{Re}\{w_{k,d,t}'H_{l_k,k,t}v_{k,d}\} + w_{k,d,t}'C_{k,t}w_{k,d,t})^{-1}.$$

In order to determine $v_{k,d}$, the terms involving $v_{k,d}$ for a fixed k and d (noting that $v_{k,d}$ is in every $C_{K,t}$) are collected and the following is derived:

$$\alpha_k(\Sigma_{t=1}^T - \beta_{k,d,t}(-2\sqrt{p_{k,d}}\text{Re}\{w_{k,d,t}'H_{l_k,k,t}v_{k,d}\})) +$$

$$\sum_{\kappa=1}^K \alpha_\kappa \sum_{\delta=1}^{\delta_\kappa} \left(\sum_{t=1}^T -\beta_{\kappa,\delta,t} w_{\kappa,\delta,t}' C_{\kappa,t} w_{\kappa,\delta,t}\right) - \mu_{k,d} v_{k,d}' v_{k,d} =$$

$$2\alpha_k \sqrt{p_{k,d}} \left(\sum_{t=1}^T \beta_{k,d,t} w_{k,d,t}' H_{l_k,k,t}\right) v_{k,d} -$$

$$\sum_{\kappa=1}^K \alpha_\kappa \sum_{\delta=1}^{\delta_\kappa} \left(\sum_{t=1}^T \beta_{\kappa,\delta,t} w_{\kappa,\delta,t}' C_{\kappa,t} w_{\kappa,\delta,t}\right) - \mu_{k,d} v_{k,d}' v_{k,d}.$$

In each term $C_{K,t} = \Sigma_{q,r} p_{q,r} H_{l_q,K,t} v_{q,r} v_{q,r}' H_{l_q,K,t}' + \sigma^2 I$, only $p_{k,d} H_{l_k,K,t} v_{k,d} v_{k,d}' H_{l_k,K,t}'$, is relevant. Therefore, there is only a need to take a derivative of $$2\alpha_k\sqrt{p_{k,d}} (\Sigma_{t=1}^T \beta_{k,d,t} w_{k,d,t}' H_{l_k,k,t}) v_{k,d} -$$

$$\Sigma_{\kappa=1}^K \alpha_\kappa \Sigma_{\delta=1}^{\delta_\kappa} (\Sigma_{t=1}^T \beta_{\kappa,\delta,t} w_{\kappa,\delta,t}' p_{k,d} H_{l_k,\kappa,t} v_{k,d} v_{k,d}' H_{l_k,\kappa,t}' w_{\kappa,\delta,t}) - \mu_{k,d} v_{k,d}' v_{k,d} =$$

$$2\alpha_k\sqrt{p_{k,d}}(\Sigma_{t=1}^T \beta_{k,d,t} w_{k,d,t}' H_{l_k,k,t}) v_{k,d} - p_{k,d}$$

$$v_{k,d}'\left(\sum_{\kappa=1}^K \alpha_\kappa \sum_{\delta=1}^{\delta_\kappa} \left(\sum_{t=1}^T \beta_{\kappa,\delta,t} H_{l_k,\kappa,t}' w_{\kappa,\delta,t} w_{\kappa,\delta,t}' H_{l_k,\kappa,t}\right)\right) v_{k,d} - \mu_{k,d} v_{k,d}' v_{k,d}.$$

Therefore, $$v_{k,d} = (p_{k,d} A_k + \mu_{k,d} I)^{-1} \left(\Sigma_{t=1}^T \beta_{k,d,t} H_{l_k,k,t}' w_{k,d,t}\right)\alpha_k\sqrt{p_{k,d}}$$

where $$A_k = \Sigma_{\kappa=1}^K \alpha_\kappa \Sigma_{\delta=1}^{\delta_\kappa} (\Sigma_{t=1}^T \beta_{\kappa,\delta,t} H_{l_k,\kappa,t}' w_{\kappa,\delta,t} w_{\kappa,\delta,t}' H_{l_k,\kappa,t}).$$

The following identities connecting the access node-side precoding and UE-side combining, implying a strong coupling between the access node and the UE for the obtained solution:

$$v_{k,d}'(p_{k,d}A_k + \mu_{k,d}I)v_{k,d} = \alpha_k \Sigma_{t=1}^T \beta_{k,d,t} w_{k,d,t}' C_{k,t} w_{k,d,t}.$$

The global centralized solution is expressible as:

$$w_{k,d,t} = \sqrt{p_{k,d}} C_{k,t}^{-1} H_{l_k,k,t} v_{k,d};$$

$$C_{k,t} = \Sigma_{K,\delta} p_{K,\delta} H_{l_K,k,t} v_{K,\delta} v_{K,\delta}' H_{l_K,k,t}' + \sigma^2 I;$$

$$\beta_{k,d,t} = (1 - w_{k,d,t}' C_{k,t} w_{k,d,t})^{-1};$$

$$v_{k,d} = (p_{k,d} A_k + \mu_{k,d} I)^{-1} (\Sigma_{t=1}^T \beta_{k,d,t} H_{l_k,k,t}' w_{k,d,t})\alpha_k\sqrt{p_{k,d}};$$

and $$A_k = \Sigma_{K=1}^K \alpha_K \Sigma_{\delta=1}^{\delta_K} (\Sigma_{t=1}^T \beta_{K,\delta,t} H_{l_k,K,t}' w_{K,\delta,t} w_{K,\delta,t}' H_{l_k,K,t}).$$

The global centralized solution may be implemented iteratively. Although there is no theoretic guarantee of convergence or achieving the global optimum, it is generally observed that the global centralized solution converges and leads to performance gains compared to other approaches.

According to an example embodiment, the global centralized solution is implemented in a distributed manner. The global centralized solution may be distributed and approximated by communicating devices (e.g., access nodes and UEs) in a TDD system if UE k transmits a sounding signal (e.g., a sounding reference signal, or SRS) with precoder $w_{k,d,t}$ on subcarrier t for layer d, and the access node estimates $v_{k,d}$ based on the received sounding signal associated with $w_{k,d,t}$ and the covariance matrices from all the sounding signals (including serving signals and interference) and all subcarriers. However, to meet the above-described wideband constraint (2), the precoder $w_{k,d,t}$ needs to be the common for all t (hence denoted $\tilde{w}_{k,d}$) to enable time-domain filtering (e.g., based on the channel power delay profile or channel impulse response) of the wideband channel by the access node, while remaining sufficiently close to combiners $w_{k,d,t}$, or the $v_{k,d}$ determined from one $\tilde{w}_{k,d}$ and that from all $w_{k,d,t}$'s are sufficiently close. In addition, even with a common $\tilde{w}_{k,d}$, the channels $H_{l_k,k,t}'$ are different on each subcarrier. To obtain a common $v_{k,d}$ based on a set of $H_{l_k,k,t}'\tilde{w}_{k,d}$, one way to do so is to derive a common channel matrix for all the subcarriers, and the common channel matrix should be close to the channel matrices for the subcarriers in a certain sense.

Therefore, there is motivation to solve the following problem: Given a set of T matrices $H_1, \ldots, H_t, \ldots, H_T \in \mathbb{C}^{n \times m}$, find $H \in \mathbb{C}^{n \times m}$ to best approximate the set of matrices. This problem is referred to as finding a narrowband representation of a set of wideband channels.

It is possible to simply average the channel coefficients. A naive way to determine a narrowband representation H of a set of wideband channels is, for a given set of T matrices $H_1, \ldots, H_t, \ldots, H_T \in \mathbb{C}^{n \times m}$, n≥m, then $H \in \mathbb{C}^{n \times m}$ is expressible as:

$$\min_H \sum_{t=1}^T \|H_t - H\|_F^2.$$

Figure 10A:
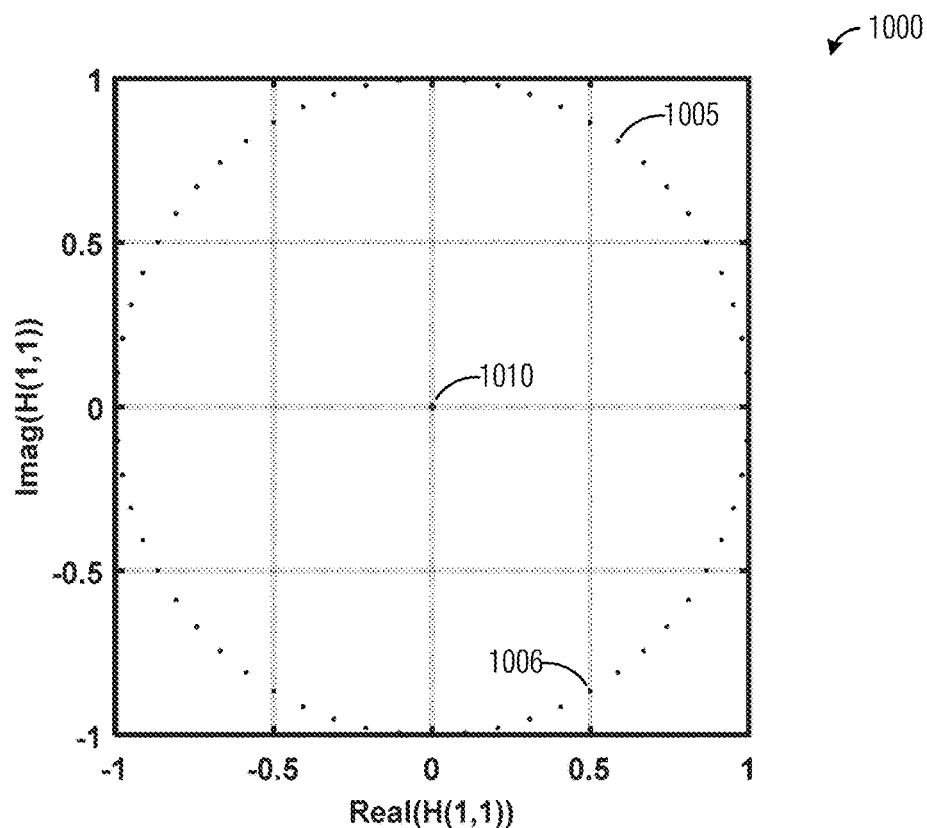
FIG. 10A illustrates a diagram of the channel coefficients of an example set of T matrices and a narrowband representation H according to example embodiments presented herein.

A simple calculation shows that the optimal solution is $H = \Sigma_{t=1}^T H_t$. However, in some cases the simple average of the channel coefficients does not represent the $H_t$'s well. For example, if the channel coefficients are distributed evenly on a circle around the origin, the simple average becomes zero. One example of such a case is shown in FIG. 10A, which illustrates a diagram 1000 of the channel coefficients of an example set of T matrices and a narrowband representation H. As shown in FIG. 10A, the channel coefficients of the set of T matrices, e.g., coefficients 1005 and 1006, are distributed evenly on a circle centered around the origin. The simple average of the channel coefficients leads to zero magnitude, shown in FIG. 10A as point 1010, also located at the origin. Hence, a narrowband representation of a channel with zero, or vanishing magnitude/power/energy cannot effectively be used for BiT operations.

However, $(\Sigma_{t=1}^T \beta_{k,d,t} H_{l_k,k,t}' w_{k,d,t})$ is not ill-posed because the effective channels on the subcarriers are summed up constructively due to that fact that each $w_{k,d,t}$ is set based on the corresponding $H_{l_k,k,t}'$. However, $(\Sigma_{t=1}^T \beta_{k,d,t} H_{l_k,k,t}' \tilde{w}_{k,d}) = (\Sigma_{t=1}^T \beta_{k,d,t} H_{l_k,k,t}')\tilde{w}_{k,d}$ is ill-posed. Thus there is a need to find a different representation of the sum of channel matrices.

According to an embodiment, one way to prevent the vanishing magnitude problem due to summation is to select one subcarrier in a subband as a narrowband representation of the wideband channels and perform the narrowband BiT algorithm on this representative subcarrier. The narrowband representation of the wideband channels is referred to as $H_{NB}$. For example, a simple technique for selecting the subcarrier is to select the center subcarrier as the narrowband representation. This simple technique does not require any additional processing or any overhead. However, this may be problematic if the representative subcarrier happens to be experiencing deep fading, an unusually stronger or weaker interference, and so on, which may lead the representative subcarrier to be substantially different from other subcarriers in the subband. It may be possible to attempt to find the optimal subcarrier to be the representative subcarrier, but search usually ends up being an exhaustive search or the like. In general, relying on only one subcarrier as opposed to multiple subcarriers lacks robustness. Therefore there is a need to find the optimal representation based on the channels of all available subcarriers in the subband.

According to an embodiment, in order to avoid the vanishing magnitude problems discussed previously, it is beneficial if the narrowband representation maintains the power/energy of the wideband channels. That is, the second moment of the narrowband representation should be close to that of the wideband channels, whereas the "closeness" may be measured according to certain matrix norms of the difference between the narrowband representation and the wideband channels. In other words, the second moment should differ by less than a power threshold, or the second moment difference should be minimized (optimized) in certain sense. For a matrix H, the second moment may be expressible as either HH' or H'H. Therefore, the second moment errors, computed in either way, to the wideband channels are needed.

Of course, restricting only the second moments does not ensure the first moment is uniquely determined nor close to that of the wideband channels. Therefore, a multi-step process includes: first solving the set of H meeting the second moment optimality, and then applying a first moment condition to find an admissible narrowband representation that is optimal in the sense of both the first and second moments. In other words, the phase of the narrowband representation and the phases of the wideband channels differ by less than a phase threshold or their difference should be minimized (optimized) in certain sense. The first moment is related to the phase of the wideband and narrowband channels, and may be generally referred to as a phase domain component of the channel, a phase domain quantity, a first moment of the channel, a phase domain approximation, etc. The second moment is related to the power (or energy, magnitude, or amplitude) of the wideband and narrowband channels, and may be generally referred to as a power (or energy, magnitude, or amplitude) domain component of the channel, a power (or energy, magnitude, or amplitude) domain quantity, a first moment of the channel, a power (or energy, magnitude, or amplitude) domain approximation, etc.

The power threshold/optimization and/or the phase threshold/optimization may be specified by a technical standard, or by an operator of the wideband communication system. Furthermore, historical performance information may be used to tweak the power threshold and/or the phase threshold to help the communication system meet performance criteria, such as data rate, quality of service (QoS) restrictions, etc.

Finding the narrowband representation that maintains the power/energy of the wideband channels is referred to as problem F3. The problem F3 is also referred to as the second moment optimality condition and is related to the power of the wideband and narrowband channels. The problem F3 is expressible as: Given a set of T matrices $H_1, \ldots, H_t, \ldots, H_T \in \mathbb{C}^{n \times m}$, $n \geq m$, find $H \in \mathbb{C}^{n \times m}$ for $$\operatorname*{argmin}_{H} \|L - HH'\|_F^2 + \|R - H'H\|_F^2$$

where $$L = \frac{1}{T}\sum_{t=1}^{T} H_t H_t', \quad R = \frac{1}{T}\sum_{t=1}^{T} H_t' H_t.$$

Assume without loss of generality that the following eigenvalue decomposition (EVD) for L and R is possible: $L = US_L U'$ and $R = VS_R V'$, where U is n×n unitary, V is m×m unitary, and in $S_L$ and $S_R$ the eigenvalues are sorted in non-increasing order. Let $S_s = [S, 0_{m \times (n-m)}]'$, where S is diagonal such that $2S^2 = S_{L(1:m,1:m)} + S_R$.

Proposition 1: The solution to Problem F3 is expressible as:

$$\operatorname*{argmin}_{H} \|L - HH'\|_F^2 + \|R - H'H\|_F^2 =$$
$$\{H \mid H = US_S DV', D \text{ is } m \times m \text{ diagonal with } D_{(i)} = e^{j\theta_i}\}.$$

Proof of proposition 1:
Lemma 1 (von Neumann's Trace Inequality): Given A and B in $\mathbb{C}^{n \times m}$, let $a_1, \ldots, a_n$ and $b_1, \ldots, b_n$ be the singular values of A and B, respectively, and sorted in non-increasing order. Then $$\operatorname{Re}(tr(A'B)) \leq \Sigma_{i=1}^{n} a_i b_i,$$

with the inequality holding if and only if there exists unitary matrices $U_{AB}$ and $V_{AB}$ such that $A = U_{AB} \operatorname{diag}([a_1, \ldots, a_n])_{n \times m} V_{AB}'$ and $B = U_{AB} \operatorname{diag}([b_1, \ldots, b_n])_{n \times m} V_{AB}'$, where $\operatorname{diag}([a_1, \ldots, a_n])_{n \times m}$ means to arrange the diagonal matrix into n×m.

Lemma 2: Given A and B in $\mathbb{C}^{n \times m}$, let $a_1, \ldots, a_n$ and $b_1, \ldots, b_n$ be the singular values of A and B, respectively, and sorted in non-increasing order. Then $$\|A-B\|_F^2 \geq \|\operatorname{diag}([a_1, \ldots, a_n]) - \operatorname{diag}([b_1, \ldots, b_n])\|_F^2 = \Sigma_{i=1}^{n}(a_i - b_i)^2,$$

with the inequality holding if and only if there exists unitary matrices $U_{AB}$ and $V_{AB}$ such that $A = U_{AB} \operatorname{diag}([a_1, \ldots, a_n])_{n \times m} V_{AB}'$ and $B = U_{AB} \operatorname{diag}([b_1, \ldots, b_n])_{n \times m} V_{AB}'$.

Assume the following single value decomposition (SVD) for H is possible: $H = U_H S_H V_H'$, where $U_H$ is n×n unitary, $V_H$ is m×m unitary, and in $S_H$ the singular values are sorted in non-increasing order. Because $n \geq m$, $$S_H = \begin{bmatrix} S_h \\ 0_{n-m,m} \end{bmatrix}.$$

Then $$HH' = U_H S_H S_H' U_H' = U_H \begin{bmatrix} S_h^2 & 0 \\ 0 & 0_{n-m} \end{bmatrix} U_H'$$

and $$H'H = V_H S_H' S_H V_H' = V_H S_h^2 V_H'.$$

-continued

Furthermore, $$\|L - HH'\|_F^2 + \|R - H'H\|_F^2 \geq \left\|S_L - \begin{bmatrix} S_h^2 & 0 \\ 0 & 0_{n-m} \end{bmatrix}\right\|_F^2 + \|S_R - S_h^2\|_F^2 =$$

$$\sum_{i=1}^{m}\left((S_{L_i} - S_{h_i}^2)^2 + (S_{R_i} - S_{h_i}^2)^2\right) + \sum_{i=m+1}^{n} S_{L_i}^2 =$$

$$\frac{1}{2}\sum_{i=1}^{m}\left((S_{L_i} - S_{R_i})^2 + (S_{L_i} + S_{R_i} - 2S_{h_i}^2)^2\right) + \sum_{i=m+1}^{n} S_{L_i}^2 \geq$$

$$\frac{1}{2}\sum_{i=1}^{m}(S_{L_i} - S_{R_i})^2 + \sum_{i=m+1}^{n} S_{L_i}^2.$$

In the above, the first inequality is due to Lemma 2, and the inequality holds if and only if $U_H = U$ and $DV_H = V$ for some diagonal matrix D with only phase rotations (note that $U_H$, U, D, $V_H$, and V are not necessarily unique); the second equality is due to the parallelogram identity; and in the last inequality, the inequality holds if and only if $S_{L_i} + S_{R_i} - 2S_{h_i}^2 = 0$ for all i. Therefore, $\{H:H=US_SDV', D$ is m×m diagonal with $D_i = e^{j\theta_i}\}$ is the solution set of problem F3.

That is, the set of optimizing H is determined by eigenspaces of L and R, the mean of the eigenvalues of L and R, and arbitrary phase rotations captured in the diagonal matrix D contain only complex phases.

Problem F3 is equivalent to problem F3', which is expressible as:

$$\min_{H} \sum_{t=1}^{T} \|H_t H_t' - HH'\|_F^2 + \sum_{t=1}^{T} \|H_t' H_t - H'H\|_F^2.$$

This equivalence relationship is interesting because it means that it is possible to obtain the same narrowband representation using two different techniques. With respect to problem F3, the technique involves minimizing the squared error with respect to the average of the per-tone second moments. With respect to problem F3', the technique minimizes the average of squared errors with respect to the per-tone second moments. These two techniques turn out to be the equivalent.

To show this, problem F3' is rewritten as $$\Sigma_{t=1}^{T} = tr(H_tH_t'-HH')'(H_tH_t'-HH')+\Sigma_{t=1}^{T}tr(H_t'H_t-H'H)'(H_t'H_t-H'H).$$

Expand and remove constant terms $tr(\Sigma_{t=1}^{T}H_tH_t'H_tH_t')$ and $tr(\Sigma_{t=1}^{T}H_t'H_tH_t'H_t)$, the problem becomes minimize $$Ttr(-LHH'-HH'L+HH'HH')+Ttr(-RH'H-H'HR+H'HH'H)=Ttr(-2H'LH+H'HH'H)+Ttr(-2HRH'+HH'HH').$$

On the other hand, the objective in problem F3 can be rewritten as $$tr(L-HH')'(L-HH')+tr(R-H'H)'(R-H'H).$$

Expand the above expression for problem F3 and remove constant terms, then the quantity to minimize is the same as for problem F3', with exception of the constant scaling factor T.

Furthermore, D should be found while meeting the first moment optimality criterion, which is referred to as problem F4 and is expressible as:

$$\text{s.t.} \min_{D_{m \times m} \text{ diagonal and } D'D=I} \Sigma_{t=1}^{T} \|H_t - US_SDV'\|_F^2.$$

Proposition 2: If $X=V'(\Sigma_{t=1}^{T}H_t')US_s$ and the (i,i)-th element of X has phase $\theta_i$, then the solution to problem F4 is given by $D_i = e^{-j\theta_i}$.

The proof of proposition 2 is as follows: The objective is equivalent to:

$$\Sigma_{t=1}^{T}tr(H_t'H_t - H_t'US_sDV' - VD'S_s'U'H_t + VD'S_s'U'US_sDV') =$$

$$\Sigma_{t=1}^{T}tr(H_t'H_t - H_t'US_sDV'-VD'S_s'U'H_t + VD'S_s'S_sDV') =$$

$$\Sigma_{t=1}^{T}tr(H_t'H_t + S^2 - H_t'US_sDV'-VD'S_s'U'H_t).$$

Because $tr(H_t'H_t+S^2)$ is a constant, the optimization problem reduces to $$\text{s.t.} \max_{D_{m \times m} \text{diagonal and } D'D=I} \Sigma_{t=1}^{T}tr(H_t'US_sDV' + VD'S_s'U'H_t) =$$

$$\text{s.t.} \max_{D_{m \times m} \text{diagonal and } D'D=I} \Sigma_{t=1}^{T}tr(V'H_t'US_sD + D'S_s'U'H_tV) =$$

$$\text{s.t.} \max_{D_{m \times m} \text{diagonal and } D'D=I} tr(XD + D'X').$$

Because D is diagonal, so it is easy to verify that the optimal solution is to compensate the phases of the diagonal elements of X so that all the elements are summed up constructively. That is, if the (i,i)-th element of X is $r_i e^{j\theta_i}$ where $r_i>0$, then the (i,i)-th element of D is $e^{-j\theta_i}$.

Figure 10B:
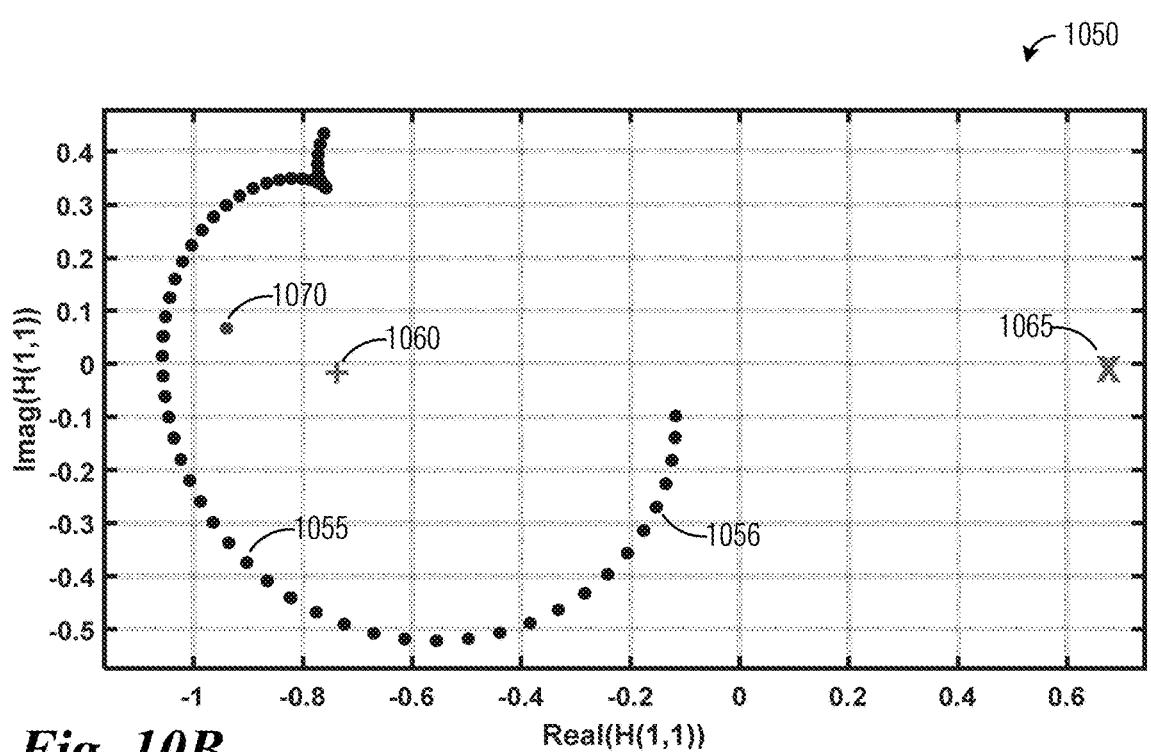
FIG. 10B which illustrates a diagram of the channel coefficients of an example set of T matrices, highlighting narrowband representations according to example embodiments presented herein.

Numerical experiments have shown that the above presented technique can resolve the vanishing magnitude problem thanks to the preservation of the second moment (which is omitted for brevity). An example of the wideband channels and the optimal narrowband representation are shown in FIG. 10B. Both steps in the optimal second moment condition and the optimal first moment approximation under second moment constraint discussed above are needed to generate a suitable representation. If only the phases are correctly chosen, the obtained channel coefficient does not well represent the wideband channels.

FIG. 10B which illustrates a diagram 1050 of the channel coefficients of an example set of T matrices, highlighting narrowband representations. As shown in FIG. 10B, the channel coefficients of the set of T matrices, e.g., coefficients 1055 and 1056. Point 1060 represents a narrowband representation based solely on first moment optimality, an example of which is a simple mean. Point 1065 represents a narrowband representation based solely on second moment optimality. Point 1070 represents a narrowband representation based on both first moment and second moment optimality. Point 1070 may be an optimal narrowband representation of the example set of T matrices.

According to an example embodiment, the narrowband representation of the wideband channels are provided to a BiT process that adapts communication filters (i.e., transmission filters (transmit precoders, transmit beamformers, or the like) and reception filters (receive combiners, receive beamformers, or the like)) in the communication system. In an embodiment, the BiT process may be a one-shot process where a single uplink training step and downlink training step occurs, or an iterative process where uplink training and downlink training alternates. In an embodiment, on each subband, each transmitter (e.g., a UE or an access node) adopts the same precoder over all subcarriers in subband, and thus allowing the receivers to perform joint channel estimation over the subcarriers. The transmit precoder is obtained from the subcarriers of the subband during the previous training step. The receiver, however, may apply different receive combiners over different subcarriers.

The wideband BiT process may be viewed as a set of narrowband BiT processes, each operating on a suitable narrowband representation of a group of subcarriers. Clearly, finding a suitable representation is a key to solving the wideband problem.

In an embodiment, a distributed wideband BiT process that takes advantage of network-wise reciprocity enables access nodes to obtain information regarding serving signal/channel, intercell interference, and intracell interference is provided. The distributed wideband BiT process uses cooperative uplink sounding, and hence can suppress both intercell and intracell interference, while improving the downlink SINR and sum rate.

Although the discussion of the example embodiments presented herein focuses on narrowband representations of wideband channels, the example embodiments are operable with any representation of the wideband channels. Therefore, the discussion of narrowband representations should not be construed as being limiting to the scope of the example embodiments.

FIG. 11 illustrates a flow diagram of example operations 1100 occurring at a device implementing a wideband BiT process. Operations 1100 may be indicative of operations occurring at a device as the device implements a wideband BiT process to determine communication filters for a wideband communication system. The device may be a network entity, such as an access node, or some other device in the wideband communication system, such as a dedicated entity configured to implement the wideband BiT process.

The device may be communicating with another device. As an example, the device may be an access node receiving from a UE. As another example, the device may be a UE receiving from an access node. The device may be referred to as a receiving device, and the device that it is receiving from may be referred to as a transmitting device. The device (the receiving device) may have multiple receive antennas (which may also be referred to as antenna ports). The transmitting device may have one or more transmit antennas, but the number of transmit antennas at the transmitting device is smaller than or equal to the number of receive antennas of the transmitting device.

The transmitting device may have one or more antenna elements, but the ports virtualized and seen by the receiving device may be small. For example, an access node may have a panel of tens to hundreds of antenna elements, but the number of ports used for RS transmission is generally limited by 16 or 32 in CSI-RS or 8 or 12 in DL DMRS. The ports may be associated with transmission layers in MIMO systems. For example, for DL DMRS and for some DL CSI-RS used in pre-scheduling/probing, each port is associated with a transmission layer of the associated PDSCH. With a RS transmitted on 8 ports of the transmitting device (e.g., an access node), the receiving device (e.g., a UE) may receive with 4 ports, and the associated channel matrix would have dimensions of 8×4. On each RS subcarrier, the receiving device may obtain one channel estimation and obtain one (individual) channel representation, i.e., channel matrix of 8×4. The receiving device may also obtain channel estimations and obtain (individual) channel representations for other, non-RS subcarriers based on certain filtering approaches. The receiving device may obtain one channel representation for a number of channel representations.

Then the receiving device may start to transmit and the transmitting device may start to receive. The above description largely applies.

In one embodiment, the UE transmits SRS with 4 ports, equal to its receiving ports, and the access node receives with all its 8 ports, or even more ports (as the ports are virtualized), e.g., 32 ports, in which case the access node obtains (individual) channel representations of dimension 4×32. In another embodiment, due to UE UL MIMO capability limitation, the UE transmits SRS with 1 port, fewer than its receiving ports, and the access node receives with all its 32 ports, in which case the access node obtains channel representations of dimension 1×32. And the next transmission may occur from the access node to the UE with MIMO dimension of 2×4 if the number of ports (layers) is 2, and so on. For each reception, the receiving device generates one channel representation of the corresponding dimension from the (individual) representations, and determines one or multiple communication filters in accordance with the channel representation (and possibly other quantities, e.g., interference measurement, total receiving covariance matrix, based on BiT algorithm, etc.). The communication filters may be receiving filters (combiners, receiving beamformers) so that the receiving device can use the filters to receive other (non-RS) transmissions. Even though per-subcarrier receiving filter is possible, receiving filters each covering several subcarriers may be more practical for its simplicity. The dimension of the receiving filter is in accordance with receiving ports. However, for transmission in the next round, generally one transmission filter (precoder, transmission beamformer) is obtained in accordance with the channel representation (and possibly other quantities). The dimension of the transmission filter is in accordance with transmitting ports, which could be different from that of the receiving filter.

In an embodiment, the wideband BiT process may be a centralized wideband BiT process or a distributed wideband BiT process. In a centralized wideband BiT process, a single device implemented the wideband BiT process, including determining the communication filters. The centralized wideband BiT process may occur in the device as described below. In a distributed wideband BiT process, multiple devices implement the wideband BiT process, with one or more devices initiating the wideband BiT process and sharing initial communication filter values, and then multiple devices perform localized BiT processing to refine the communication filters. In either the centralized wideband BiT process or the distributed wideband BiT process, the BiT processing may be one-shot or iterative.

Operations 1100 begin with the device obtaining a channel representation of the wideband channels (block 1105). The channel representation may be for a set of channels between the device and another device. The device may obtain the channel representation of the wideband channels of the wideband communication system by maintaining the power and energy of the wideband channels. As an example, the channel representation of the wideband channels is selected by selecting the channel representation such that the second moment (the power) of the channel representation differs from the second moment of the wideband representations by less than the power threshold or is as small as possible. Furthermore, the channel representation of the wideband channel is selected by selecting the channel representation such that the first moment (the phase) of the channel representation differs from the first moment of the wideband representations by less than the phase threshold or is as small as possible. The channel representation may be a narrowband representation, for example.

In a distributed BiT process implementation, the device shares (or signals, transmits, etc.) information about the channel representation of the wideband channels (block 1107). The channel representation of the wideband channels may be transmitted in one or more messages to the communication devices that will implement the distributed BiT process. As an example, the information about the channel representation of the wideband channels is provided to an access node and the access node transmits a broadcast message including the channel representation of the wideband channels. As another example, the information about the channel representation of the wideband channels is transmitted in a groupcast message. As yet another example, the information about the channel representation of the wideband channels is transmitting in a plurality of unicast messages. As yet another example, the device that obtained the channel representation of the wideband channels transmits one or more messages including the information about the channel representation of the wideband channels.

The device determines the communication filters (block 1109). The determination of the communication filters is performed using BiT, for example. The device determines the communication filters by starting with the channel representation of the wideband channels and determining/calculating/refining the communication filters in accordance with signals received from other communicating devices. As an example, the device is an access node and the access node utilizes sounding signals (e.g., sounding reference signals) transmitted by UEs to refine the communication filters. As another example, the device is a UE and the UE utilizes downlink signals (e.g., reference signals) transmitted by access nodes to refine the communication filters. If the BiT process is an iterative process, multiple refinement iterations may be performed. As an example, the refinement of the communication filters may continue until a performance threshold is met. Alternatively, the refinement of the communication filters may continue until a specified number of iterations has been performed.

In a centralized BiT process implementation, the device may utilize signals received from other devices in the communication system to determine and/or refine the communication filters. After determining the communication filters, the device may share (or signals, transmits, etc.) information about the communication filters with the other devices in the communication system. As an example, the communication filters may be transmitted in one or more messages. The messages may be broadcast, groupcast, or unicast, for example. The information about a communication filter may comprise a vector, a matrix, a quantized form of a vector/matrix, a codeword/index in a codebook, a differential vector/matrix/index related to a previous quantity, other forms of information sufficient for a receiver of the information to derive the communication filter, and the like.

The device applies the communication filters to communicate (block 1111). As an example, the device applies a reception filter to an incoming message to receive the message. Applying a reception filter to an incoming message involves applying the reception filter as the receiving combiner for receiving the message, for example. To illustrate the use of the reception filter for receiving the message, consider a situation with the individual channel representations and the obtained one channel representation have dimension of n×p, where n is the number of receiving ports at the device for receiving and p is number of transmit ports/layers/streams of the RS/message to receive. The receiving combiner can be a matrix of p×n on each receiving tone and is multiplied with the received signal on each tone. In other words, each transmit layer is multiplied by a vector (combining vector) of length n on the n receiving ports. By doing so, the transmitted p layers of the message can be received. As another example, the device applies a transmission filter to an outgoing message prior to transmitting the message. Applying a transmission filter to an outgoing message involves apply the transmission filter as the precoder (beamformer) for the message, for example. To illustrate the use of the transmission filter for transmitting the message, consider a situation with the individual channel representations and the obtained one channel representation have dimension of n×p, where n is the number of receiving ports at the device for receiving and p is number of transmit ports/layers/streams for the RS/message to receive, whereas the number of physical transmitting ports from the device is m which may be equal to or less than n, and the number of virtualized transmitting ports (or layers, streams, etc.) is q which may be equal to or less than m. The precoder can be a matrix of m×q on a set of transmitting tones in a subband and is multiplied on the q layers/ports of the message. In other words, each transmit layer is multiplied by a vector (precoding vector) of length m on the m physical transmitting ports, generating q layers (or q virtualized ports) of the message to transmit.

FIG. 12A illustrates a high-level view of example operations 1200 occurring in a device obtaining the channel representation of the wideband channels. Operations 1200 may be indicative of operations occurring in a device as the device obtains the channel representation of the wideband channels.

Operations 1200 begin with the device estimating the wideband channels (block 1205). The wideband channels may be estimated in accordance with signals received over the wideband channels. In an embodiment, an estimate is determined for each of the wideband channels. The device determines the channel representation of the wideband channels (block 1207). The channel representation of the wideband channels may be a narrowband representation, for example. The channel representation of the wideband channels is determined in accordance with the estimates of the wideband channels, for example. The channel representation of the wideband channels may be determined utilizing the wideband BiT process (either centralized or distributed) as described above.

FIG. 12B illustrates a detailed-level view of example operations 1250 occurring in a device obtaining the channel representation of the wideband channels. Operations 1250 may be indicative of operations occurring in a device as the device obtains the channel representation of the wideband channels. As an example, a narrowband representation is an example of the channel representation of the wideband channels.

Operations 1250 begin with the device estimating the wideband channels (block 1255). The wideband channels may be estimated in accordance with signals received over the wideband channels. In an embodiment, an estimate is determined for each of the wideband channels. The wideband channels may be estimated based on reference signals transmitted from an access node to a UE, in which case the reference signals may be a channel state information reference signal (CSI-RS). The wideband channels may be estimated based on reference signals transmitted from a UE to an access node, in which case the reference signal may be a sounding reference signal (SRS). The reference signal may not occur every tone in the subband, e.g., the reference signal may have a comb-like structure and occur one tone for every 4 (or some other numbers) tones. On the tones without reference signal, the receiver may perform interpolation/extrapolation of the estimate. The H1 through $H_T$ may be only the channel estimates on the pilot-carrying tones or on all the tones in the subband. For example, if a subband includes 4 PRBs with each PRB comprising 12 tones, then the subband comprises a set of 48 tones; the 2-port CSI-RS (or SRS, DMRS, etc.) may be transmitted on one tone for every 4 tones, thus 12 channel matrices can be obtained from channel estimation without additional interpolation and one channel representation of all 48 tones of the subband can be derived from the 12 channel matrices, or alternatively, more than 12 (e.g., 48) channel matrices can be obtained from channel estimation with additional interpolation, and one channel representation of all 48 tones of the subband can be derived from the more than 12 channel matrices. The reference signal may be beamformed with one or multiple ports, each associated with a transmission layer.

The device determines the left and right second moments L and R (block 1257). As discussed previously, the left and right second moments L and R are expressible as $$L = \frac{1}{T}\Sigma_{t=1}^{T} H_t H_t', \quad R = \frac{1}{T}\Sigma_{t=1}^{T} H_t' H_t,$$

respectively. The device determines the EVD of L and R (block 1259). The EVD of L and R are expressible as $$L = U S_L U' \text{ and } R = V S_R V',$$

where U is n×n unitary, V is m×m unitary. The device determines S (block 1261). The device determines S such that relationship $2S^2 = S_{L(1:m,1:m)} + S_R$ holds. The device initializes $S_s$, X, and D (block 1263). As an example, the device initializes $$S_s = [S, 0_{m \times (n-m)}]',$$

$$X = V'(\Sigma_{t=1}^{T} H_t') U S_S, \text{ and}$$

D is diagonal with elements $D_i = e^{-j\Theta_i}$.

The device generates the channel representation of the wideband channels (block 1265). The channel representation of the wideband channels is generated in accordance with U, $S_s$, D, and V', for example, and is expressible as $$H_{NB} = U S_S D V'.$$

Blocks 1257-1265 may be collectively referred to as determining the channel representation of the wideband channels (shown as blocks 1267).

Figure 13:
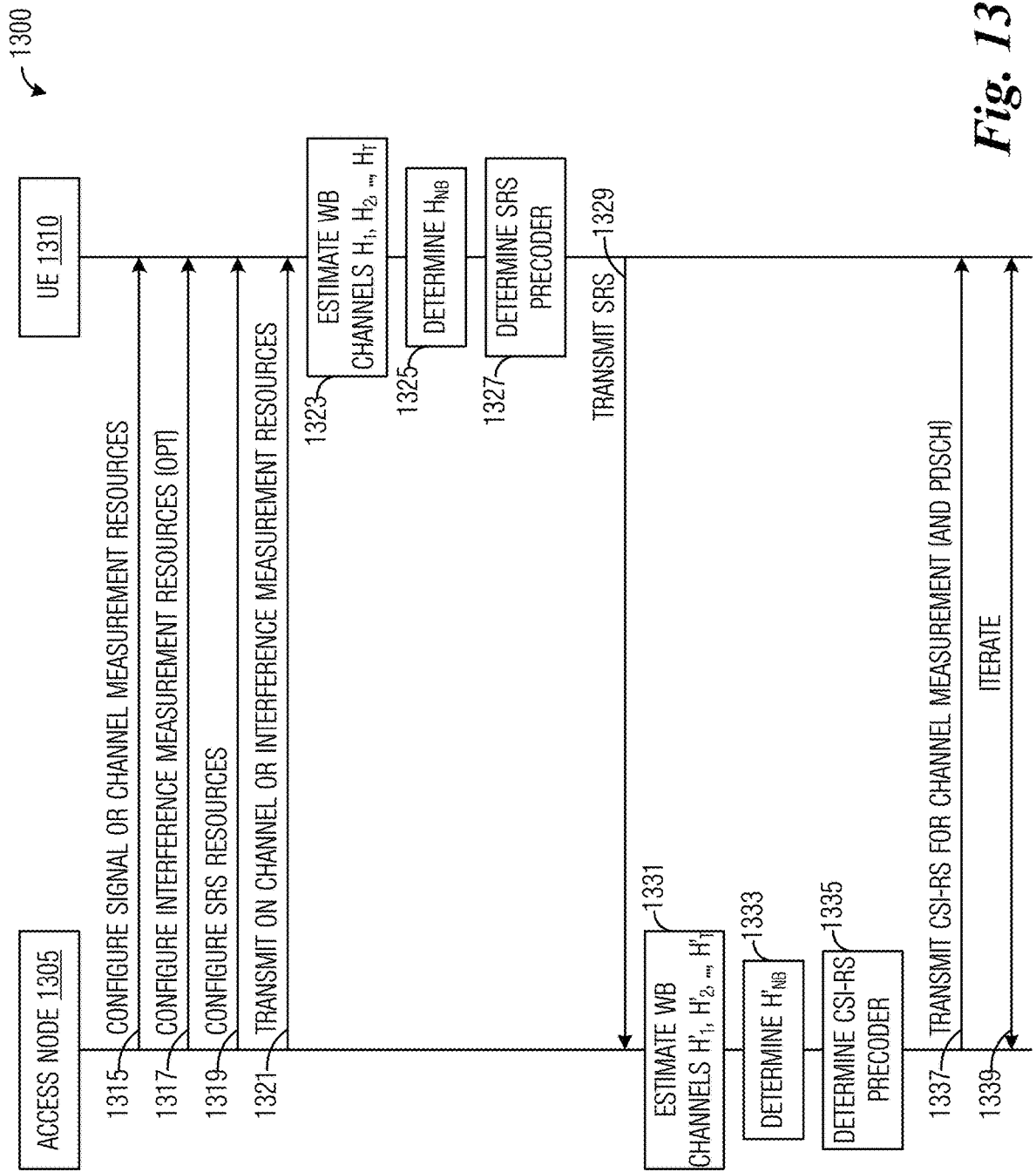
FIG. 13 illustrates a diagram highlight messages exchanged and processing performed by devices performing an iterative distributed wideband BiT process according to example embodiments presented herein.

FIG. 13 illustrates a diagram 1300 highlight messages exchanged and processing performed by devices performing an iterative distributed wideband BiT process. Diagram 1300 illustrates messages exchanged and processing performed by an access node 1305 and a UE 1310 as the devices perform the iterative distributed wideband BiT process.

Access node 1305 configures measurement resources (event 1315). The measurement resources may be signal measurement resources or channel measurement resources (CMRs), and are configured by access node 1305. Examples of CMRs may be non-zero power (NZP) CSI-RS resource, NZP CSI-RS resource set, NZP CSI-RS resource setting/configuration, synchronization signal block (SSB), etc. Access node 1305 sends information about the measurement resources to UE 1310. Access node 1305 may configure interference measurement resources (IMRs) (event 1317). Interference measurement resources may be resources that are usable by UE 1310 to measure the interference arising from transmissions made by other devices. Examples of IMRs may be zero power (ZP) CSI-RS resource, CSI-interference-measurement (CSI-IM) resource, CSI-IM resource set, CSI-IM resource setting, NZP CSI-RS resource, NZP CSI-RS resource set, NZP CSI-RS resource setting/configuration, SSB, etc. The IMRs are associated with the CMRs in the sense of quasi-co-location (QCL) relationship. Access node 1305 sends information about the interference measurement resources to UE 1310. The configuring of the interference measurement resources may be optional. Access node 1305 configures SRS resource(s) or SRS resource set(s) (event 1319). Access node 1305 also configures resources that UE 1310 may use to transmit SRS to enable access node 1305 (and potentially other devices) to make channel measurements. Access node 1305 sends information about the SRS resources to UE 1310. Access node 1305 transmits on signal or channel measurement resources, and if configured, interference measurement resources (event 1321). Access node 1305 may transmit reference signals or some other signal that is known by UE 1310 in the signal, channel, or interference measurement resources.

UE 1310 estimates the wideband channels in accordance with signals received over the signal or channel measurement resources (block 1323). If interference measurement resources were configured, UE 1310 may estimate the interference in accordance with the signals received over the interference measurement resources. UE 1310 determines the channel representation of the wideband channels (block 1325). As an example, UE 310 determines a narrowband representation of the wideband channels. UE 1310 may determine the channel representation of the wideband channels utilizing the techniques discussed previously. UE 1310 determines the SRS precoder (block 1327). The SRS precoder (a communication filter) may be determined in accordance with the channel, such as a narrowband, representation of the wideband channels. The SRS may have one or more ports (i.e., rank 1 or higher rank), each associated with a transmission layer. For example, the SRS precoder may be aligned with $H_{NB}$. For another example, the SRS precoder may be the dominant singular vector of the $H_{NB}$, or dominant singular vectors of the $H_{NB}$, where the number of the vectors is equal to the number of ports of the SRS. For another example, the SRS precoder may be $R^{-1} H_{NB}$, where R is the covariance matrix obtained on the IMR containing interference and noise, or R is the covariance matrix obtained on the CMR and IMR containing signal, interference, and noise. The SRS precoder may be the dominant singular vector(s) of $R^{-1} H_{NB}$. UE 1310 may use a distributed BiT process for example. UE 1310 transmits the SRS (event 1329). UE 1310 precodes the SRS using the SRS precoder, for example. The SRS is transmitted in the SRS resources, as configured in event 1319.

Access node 1305 estimates the wideband channels in accordance with SRS received over the SRS resources (block 1331). Access node 1305 determines the channel representation of the wideband channels (block 1333). Access node 1305 may determine the channel, such as a narrowband, representation of the wideband channels utilizing the techniques discussed previously. Access node 1305 determines the CSI-RS precoder (block 1335). The CSI-RS precoder (a communication filter) may be determined in accordance with the channel representation of the wideband channels. The CSI-RS may have one or more ports (i.e., rank 1 or higher rank), each associated with a transmission layer. For example, the CSI-RS precoder may be aligned with $H'_{NB}$. For another example, the SRS precoder may be the dominant singular vector of the $H'_{NB}$, or dominant singular vectors of the $H'_{NB}$, where the number of the vectors is equal to the number of ports of the CSI-RS. For another example, the CSI-RS precoder may be $R^{-1} H'_{NB}$, where R is the UL covariance matrix obtained on the sounding resources containing interference and noise, or R is the covariance matrix on sounding resources containing signal, interference, and noise. The CSI-RS precoder may be the dominant singular vector(s) of $R^{-1} H'_{NB}$. Access node 1305 may use a distributed BiT process for example. Access node 1305 transmits the CSI-RS (event 1329). The CSI-RS is transmitted in the signal or channel measurement resources. Access node 1305 precodes the CSI-RS using the CSI-RS precoder, for example.

Events and blocks 1321-1337 may iterate (shown simply as event 1339) multiple times until a convergence criterion is met or an iteration count is met. If a one-shot distributed BiT process is being used by access node 1305 and UE 1310 instead of the iterative distributed BiT process, access node 1305 and UE 1310 do not iterate (shown as event 1339). In either case, a physical downlink shared channel (PDSCH) transmission with a precoder, such as the one derived by access node 1305, may be performed and the UE may receive the PDSCH.

In an embodiment, a tone that is common to both the access node and the UE is used as the channel representation of the wideband channels. After determining the channel representation of the wideband channels, a tone that is closest to the channel representation is selected and signaled, in order to indicate the channel representation. "Closest" may be in the sense that the difference between the tone's channel matrix and the matrix $H_{NB}$ is the smallest over all tones in terms of a certain matrix norm, such as the Frobenius norm. As an example, it is possible to define the distance (or metric, etc., induced by a norm) between a first quantity A and a second quantity B as $\|A-B\|$, i.e., the normed difference between the two quantities. Based on this definition of distance, it is possible to describe how close the two quantities are (e.g., A is the closest to B, and so on). The tone is used by both the access node and the UE as the channel representation. Because the tone is known by both the access node and the UE, a simple indicator of the tone would be the index number of the tone.

Figure 14A:
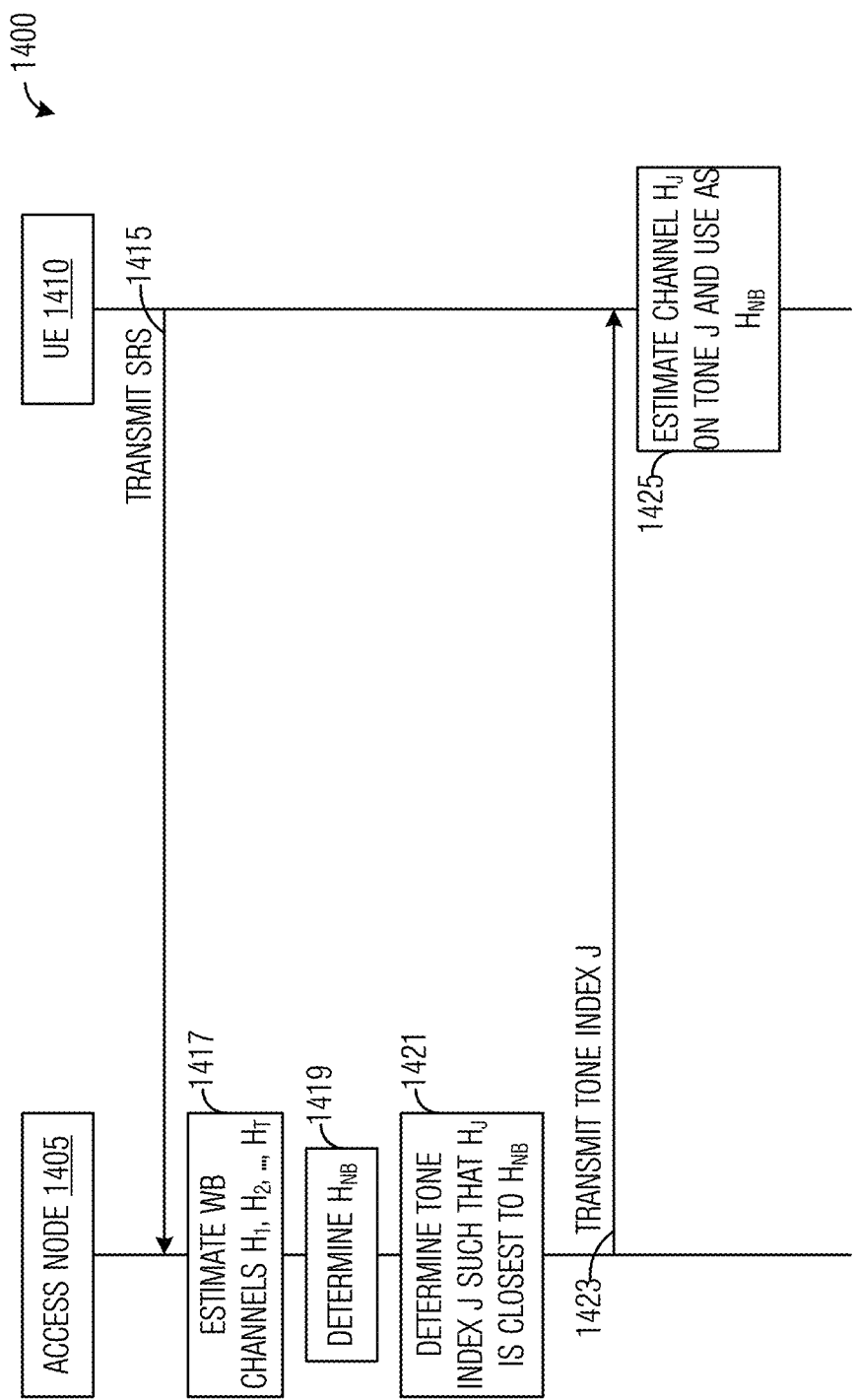
FIG. 14A illustrates a diagram highlight messages exchanged and processing performed by devices sharing a tone index as the narrowband representation of wideband channels, where an access node determines the narrowband representation according to example embodiments presented herein.

FIG. 14A illustrates a diagram 1400 highlighting messages exchanged and processing performed by devices sharing a tone index as the channel representation of wideband channels, where an access node determines the channel representation. Diagram 1400 illustrates messages exchanged and processing performed by an access node 1405 and a UE 1410 as the devices share a tone index as the channel representation of wideband channels, where access node 1405 determines the channel representation.

UE 1410 transmits a SRS (event 1415). The SRS may be precoded with a SRS precoder, and transmitted in SRS resources configured by access node 1405. The configuration of the measurement resources, SRS resources, etc., is not shown in FIG. 14A. However, the configuration of the resources may proceed as shown in events 1315-1319 of FIG. 13.

Access node 1405 estimates the wideband channels in accordance with SRS received over the SRS resources (block 1417). Access node 1405 determines the channel representation of the wideband channels (block 1419). Access node 1405 may determine the channel representation of the wideband channels utilizing the techniques discussed previously. Access node 1405 determines a tone J such that channel $H_J$ is closest to the channel representation (block 1421). Such a determination may be performed via the solution to the following optimization problem: $J=\text{argmin}\ \|H_t-H_{NB}\|$, where $t=1, 2, \ldots, T$. Access node 1405 transmits an index corresponding to the tone J (event 1423). UE 1410 estimates the channel $H_J$ on tone J and uses $H_J$ as the channel representation (block 1425).

Although not shown in FIG. 14A, a BiT process (such as an iterative distributed BiT process, a one-shot distributed BiT process, etc.) may occur after the channel representation of the wideband channels has been determined.

Figure 14B:
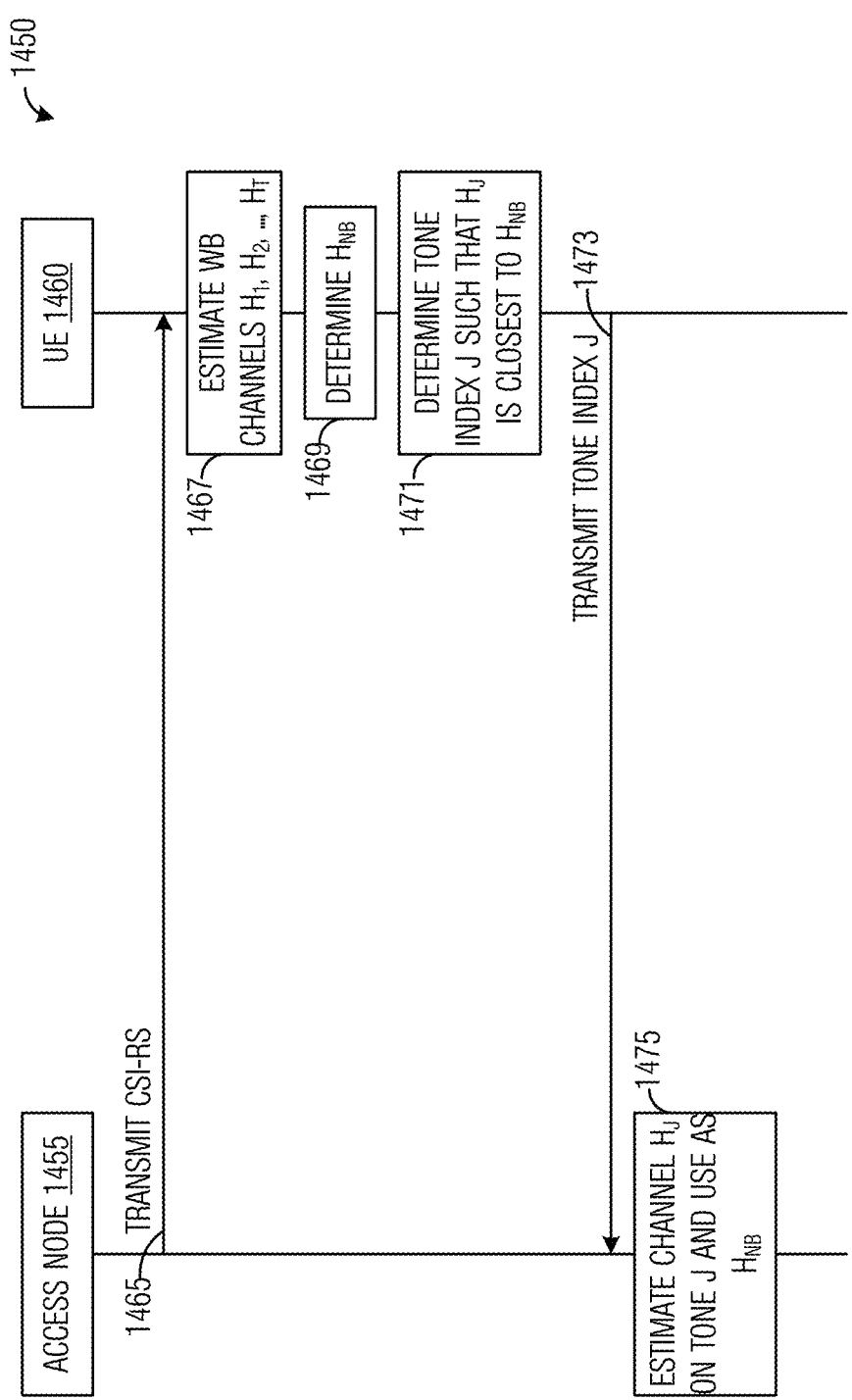
FIG. 14B illustrates a diagram highlight messages exchanged and processing performed by devices sharing a tone index as the narrowband representation of wideband channels, where a UE determines the narrowband representation according to example embodiments presented herein.

FIG. 14B illustrates a diagram 1450 highlighting messages exchanged and processing performed by devices sharing a tone index as the channel representation of wideband channels, where a UE determines the channel representation. Diagram 1450 illustrates messages exchanged and processing performed by an access node 1455 and a UE 1460 as the devices share a tone index as the channel representation of wideband channels, where UE 1460 determines the channel representation.

Access node 1455 transmits a CSI-RS (event 1465). The CSI-RS may be precoded with a CSI-RS precoder, and transmitted in measurement resources configured by access node 1455. The configuration of the measurement resources, CSI-RS resources, etc., is not shown in FIG. 14B. However, the configuration of the resources may proceed as shown in events 1315-1319 of FIG. 13.

UE 1460 estimates the wideband channels in accordance with CSI-RS received over the measurement resources (block 1467). UE 1460 determines the channel representation of the wideband channels (block 1469). UE 1460 may determine the channel representation of the wideband channels utilizing the techniques discussed previously. UE 1460 determines a tone J such that channel $H_J$ is closest to the channel representation (block 1471). Such a determination may be performed via the solution to the following optimization problem: $J=\text{argmin}\ \|H_t-H_{NB}\|$, where $t=1, 2, \ldots, T$. UE 1460 transmits an index corresponding to the tone J (event 1473). Access node 1455 estimates the channel $H_J$ on tone J and uses $H_J$ as the channel representation (block 1475).

Although not shown in FIG. 14B, a BiT process (such as an iterative distributed BiT process, a one-show distributed BiT process, etc.) may occur after the channel representation of the wideband channels has been determined.

In an example embodiment, in an iterative distributed BiT process (such as in a wireless-to-everything deployment, fixed wireless access deployment, etc.), both access node and UE have to have the same channel representation. Hence, the access node and the UE may use the same standardized BiT process algorithm to determine the channel representation to optimize performance.

In an example embodiment, in an iterative distributed BiT process (such as in a wireless-to-everything deployment, fixed wireless access deployment, etc.), both access node and UE have to have the same channel representation. Hence, the access node and the UE may use the same standardized BiT process algorithm to determine a common tone that is closest to the narrowband representation to optimize performance.

In an example embodiment, in a non-iterative distributed BiT process, such as one-shot BiT, the UE uses a standardized BiT process algorithm to determine the channel representation.

In an example embodiment, in a non-iterative distributed BiT process, such as one-shot BiT, with no standardized BiT process algorithm, but there are standardized UE assumptions regarding transmit precoding on the wideband channels. As an example, the UE derives the uplink transmit precoder for each layer in accordance with one representation of the downlink wideband channel matrices for that layer, where the representation maintains the first and second moments of the wideband channel matrices (or the representation is derived is based on the channel matrices while maintaining the second moment of the channel matrices).

In an example embodiment, the channel representation of the downlink wideband channel matrices (Nt×Nr×Ntones) as provided in a compressed feedback report (Nt×Nr), and are derived based on standardized UE assumptions. For example, in a FDD system, an access node transmits CSI-RS on Ntones of a subband, and on each tone, the MIMO channel matrix is of size Nt×Nr, with the channel matrix potentially being different for each tone. The UE performs channel estimation on these tones and generate a CSI report. The CSI report typically includes channel quality indicator (CQI), precoding matrix indication (PMI), one singular vector, etc. The CSI report contains quite limited information. However, in order for the access node to deliver higher spectrum efficiency via, e.g., MU pairing, it is desirable for the access node to have full DL channel information, such as the channel matrix information, which is generally difficult for FDD WB systems, because each tone has a different channel matrix. In this case, the UE may feedback one channel matrix $H_{NB}$, which is the best representation of all the Ntones channel matrices, preserving the power/phase information. Then the access node can operate based on the full DL channel information, which can lead to much higher spectrum efficient performance in MU-MIMO/Massive MIMO than the case where only CQI/PMI/other limited channel information is reported. To this end, the access node may instruct the UE to generate a CSI report based on the WB channels in a subband, and the CSI report is a matrix of size Nt×Nr whose second moment is the closest to the second moment of the WB channels and whose first moment is also the closest to the first moment of the WB channels given the second moment constraint. The CSI report, including the matrix, may be quantized to reduce communication overhead.

Figure 15A:
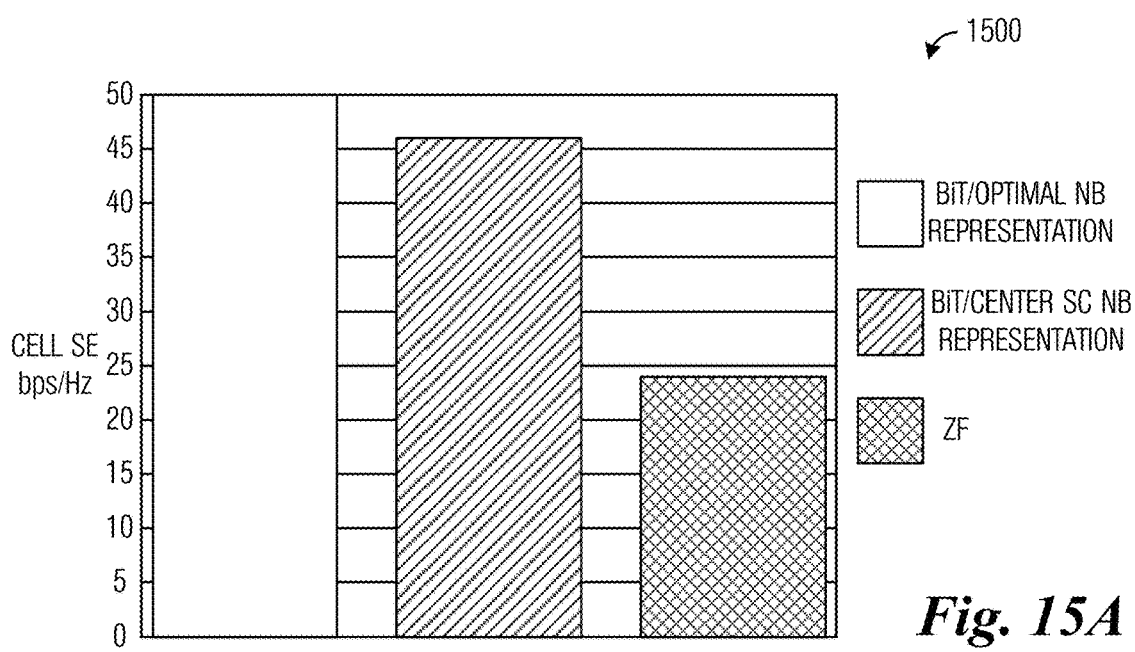
FIG. 15A illustrates a graph of cell spectral efficiency of BiT and ZF according to example embodiments presented herein.
Figure 15B:
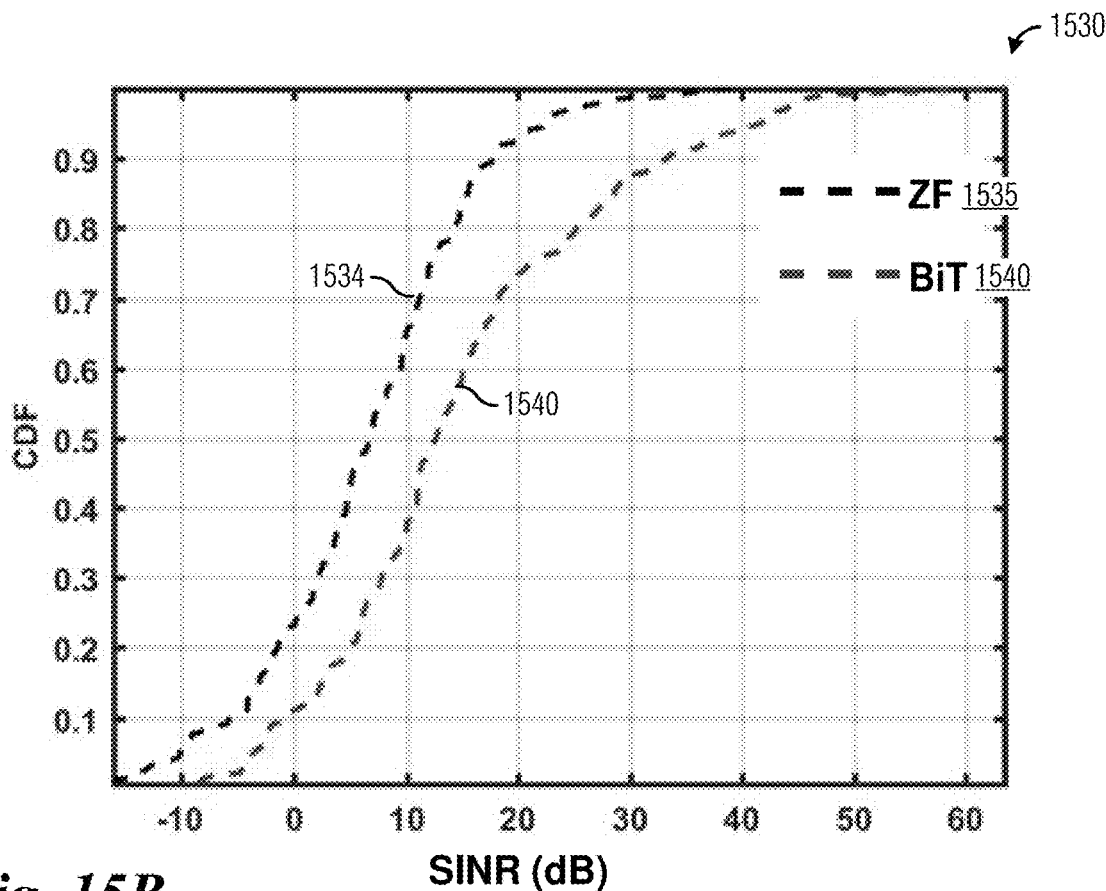
FIG. 15B illustrates a data plot of SINR cumulative distribution functions (CDF) for BiT and ZF according to example embodiments presented herein.
Figure 15C:
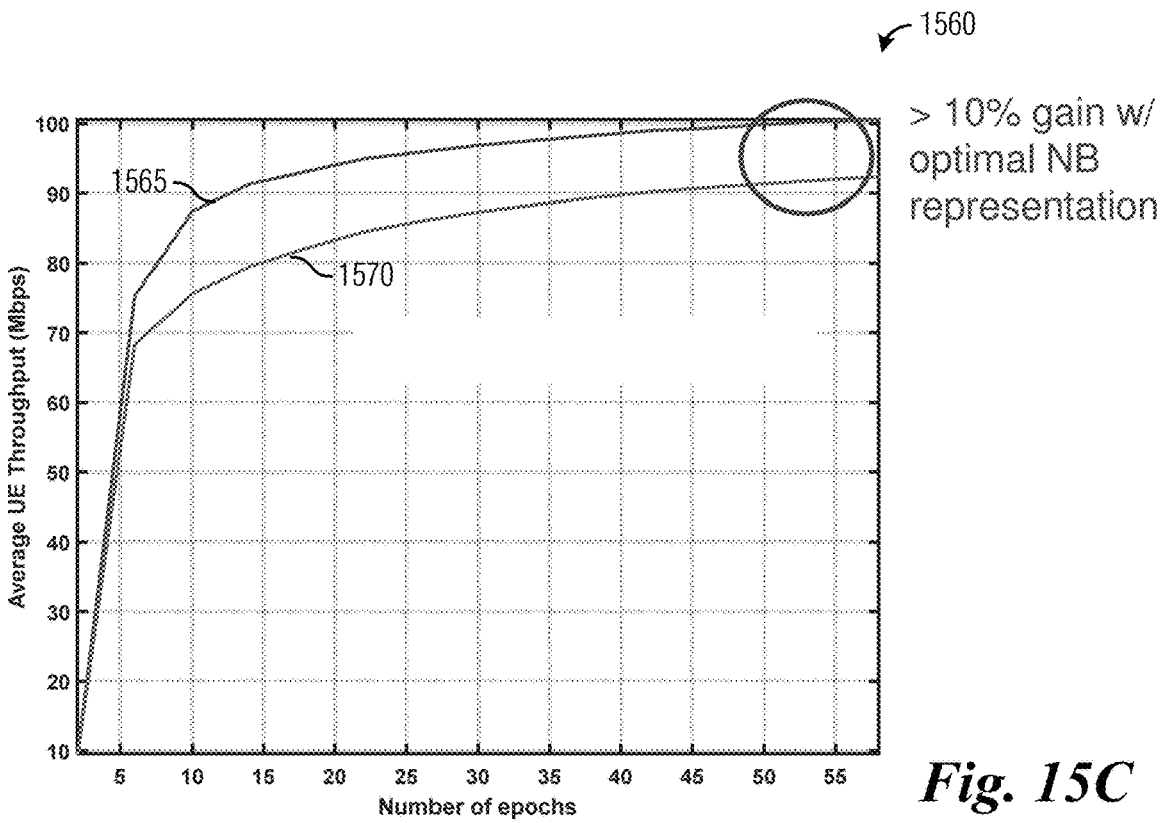
FIG. 15C illustrates a data plot of the convergence of BiT and ZF according to example embodiments presented herein.

Simulation results are provided to evaluate the performance of the wideband BiT algorithm in a multi-cell wideband system. The deployment scenarios are based on 3GPP models. One baseline is ZF based massive MIMO, which shows much worse spectral efficiency (SE) performance than BiT. FIG. 15A illustrates a graph 1500 of cell spectral efficiency of BiT and ZF. With the wideband BiT techniques proposed in the example embodiments presented herein, more than a 50% SE gain is achieved over ZF for a number of deployment scenarios (some results are omitted for brevity). Also compared is one naive approach of extending BiT to wideband by using the center subcarrier as the narrowband representation. The degraded performance compared to the one with optimal narrowband representation can be easily seen in FIG. 15A. FIG. 15B illustrates a data plot 1530 of SINR cumulative distribution functions (CDF) for BiT and ZF. A first curve 1535 represents the SINR CDF for ZF and a second curve 1540 represents the SINR CDF for BiT. The results confirm the high SE performance gains of wideband BiT, and that the gains come from increased SINR due to inter-cell interference avoidance as illustrated in FIG. 15B. FIG. 15C illustrates a data plot 1560 of the convergence of BiT and ZF. A first curve 1565 represents the convergence for ZF and a second curve 1570 represents the convergence for BiT. The number of BiT training iterations can be very small, typically achieving about 90% of the steady-state performance within two rounds of training (as shown in FIG. 15C).

Figure 16:
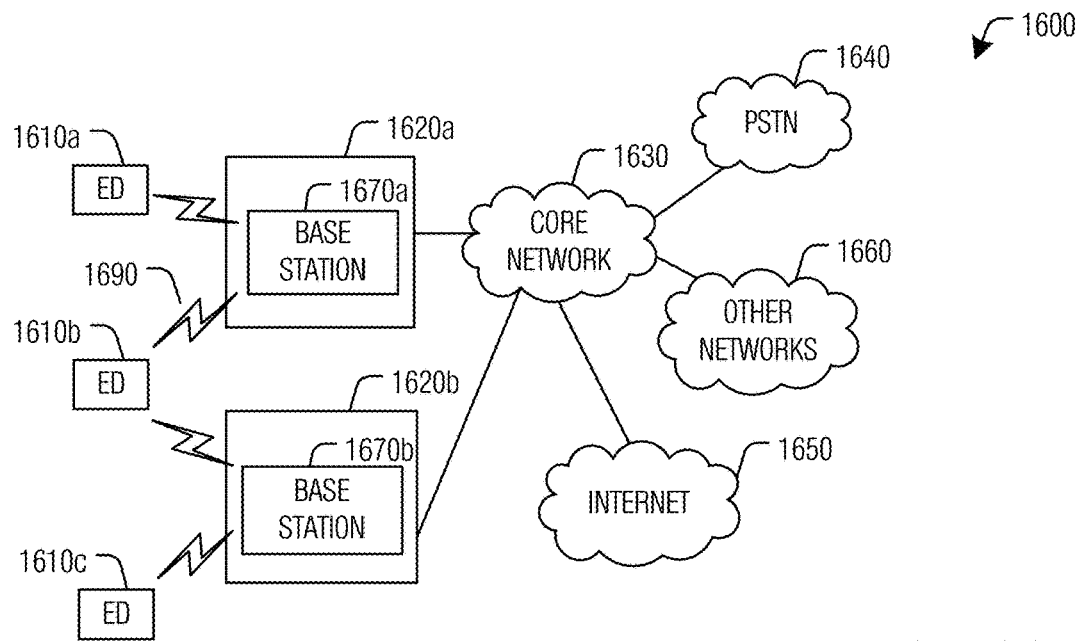
FIG. 16 illustrates an example communication system according to example embodiments presented herein.

FIG. 16 illustrates an example communication system 1600. In general, the system 1600 enables multiple wireless or wired users to transmit and receive data and other content. The system 1600 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1600 includes electronic devices (ED) 1610a-1610c, radio access networks (RANs) 1620a-1620b, a core network 1630, a public switched telephone network (PSTN) 1640, the Internet 1650, and other networks 1660. While certain numbers of these components or elements are shown in FIG. 16, any number of these components or elements may be included in the system 1600.

The EDs 1610a-1610c are configured to operate or communicate in the system 1600. For example, the EDs 1610a-1610c are configured to transmit or receive via wireless or wired communication channels. Each ED 1610a-1610c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1620a-1620b here include base stations 1670a-1670b, respectively. Each base station 1670a-1670b is configured to wirelessly interface with one or more of the EDs 1610a-1610c to enable access to the core network 1630, the PSTN 1640, the Internet 1650, or the other networks 1660. For example, the base stations 1670a-1670b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1610a-1610c are configured to interface and communicate with the Internet 1650 and may access the core network 1630, the PSTN 1640, or the other networks 1660.

In the embodiment shown in FIG. 16, the base station 1670a forms part of the RAN 1620a, which may include other base stations, elements, or devices. Also, the base station 1670b forms part of the RAN 1620b, which may include other base stations, elements, or devices. Each base station 1670a-1670b operates to transmit or receive wireless signals within a particular geographic region or area, sometimes referred to as a "cell." In some embodiments, multiple-input multiple-output (MIMO) technology may be employed having multiple transceivers for each cell.

The base stations 1670a-1670b communicate with one or more of the EDs 1610a-1610c over one or more air interfaces 1690 using wireless communication links. The air interfaces 1690 may utilize any suitable radio access technology.

It is contemplated that the system 1600 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1620a-1620b are in communication with the core network 1630 to provide the EDs 1610a-1610c with voice, data, application, Voice over Internet Protocol (VoIP), or other services. Understandably, the RANs 1620a-1620b or the core network 1630 may be in direct or indirect communication with one or more other RANs (not shown). The core network 1630 may also serve as a gateway access for other networks (such as the PSTN 1640, the Internet 1650, and the other networks 1660). In addition, some or all of the EDs 1610a-1610c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1650.

Although FIG. 16 illustrates one example of a communication system, various changes may be made to FIG. 16. For example, the communication system 1600 could include any number of EDs, base stations, networks, or other components in any suitable configuration.

Figure 17A:
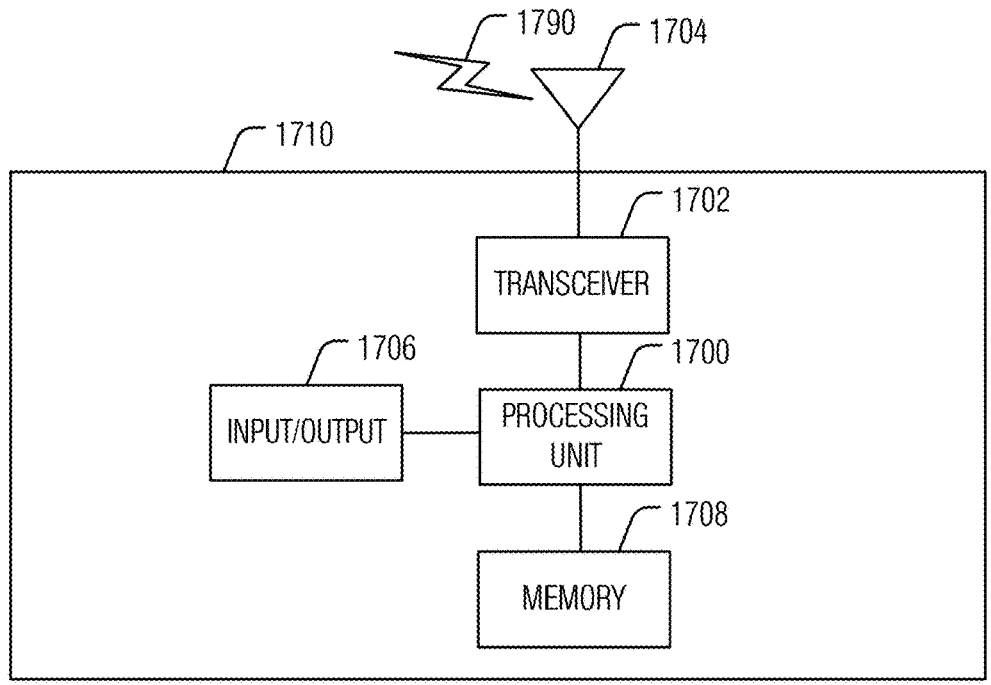
FIGS. 17A and 17B illustrate example devices that may implement the methods and teachings according to this disclosure.
Figure 17B:
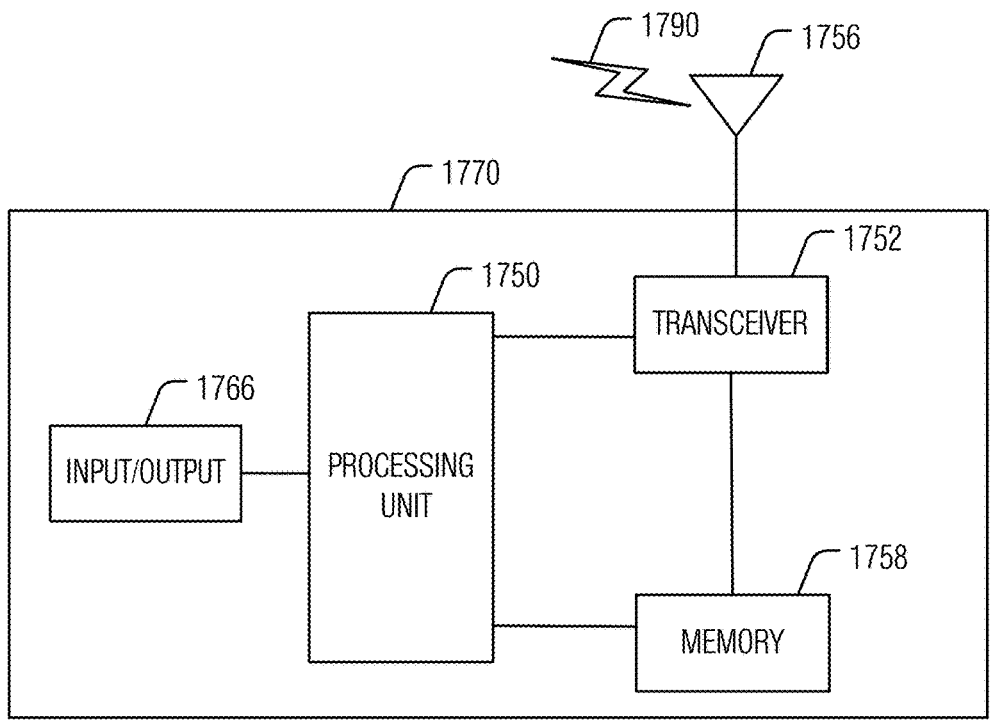

FIGS. 17A and 17B illustrate example devices that may implement the methods and teachings according to this disclosure. In particular, FIG. 17A illustrates an example ED 1710, and FIG. 17B illustrates an example base station 1770. These components could be used in the system 1600 or in any other suitable system.

As shown in FIG. 17A, the ED 1710 includes at least one processing unit 1700. The processing unit 1700 implements various processing operations of the ED 1710. For example, the processing unit 1700 could perform signal coding, data processing, power control, input/output processing, or any other functionality enabling the ED 1710 to operate in the system 1600. The processing unit 1700 also supports the methods and teachings described in more detail above. Each processing unit 1700 includes any suitable processing or computing device configured to perform one or more operations. Each processing unit 1700 could, for example, include a microprocessor, microcontroller, digital signal processor, field programmable gate array, or application specific integrated circuit.

The ED 1710 also includes at least one transceiver 1702. The transceiver 1702 is configured to modulate data or other content for transmission by at least one antenna or NIC (Network Interface Controller) 1704. The transceiver 1702 is also configured to demodulate data or other content received by the at least one antenna 1704. Each transceiver 1702 includes any suitable structure for generating signals for wireless or wired transmission or processing signals received wirelessly or by wire. Each antenna 1704 includes any suitable structure for transmitting or receiving wireless or wired signals. One or multiple transceivers 1702 could be used in the ED 1710, and one or multiple antennas 1704 could be used in the ED 1710. Although shown as a single functional unit, a transceiver 1702 could also be implemented using at least one transmitter and at least one separate receiver.

The ED 1710 further includes one or more input/output devices 1706 or interfaces (such as a wired interface to the Internet 1650). The input/output devices 1706 facilitate interaction with a user or other devices (network communications) in the network. Each input/output device 1706 includes any suitable structure for providing information to or receiving information from a user, such as a speaker, microphone, keypad, keyboard, display, or touch screen, including network interface communications.

In addition, the ED 1710 includes at least one memory 1708. The memory 1708 stores instructions and data used, generated, or collected by the ED 1710. For example, the memory 1708 could store software or firmware instructions executed by the processing unit(s) 1700 and data used to reduce or eliminate interference in incoming signals. Each memory 1708 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 17B, the base station 1770 includes at least one processing unit 1750, at least one transceiver 1752, which includes functionality for a transmitter and a receiver, one or more antennas 1756, at least one memory 1758, and one or more input/output devices or interfaces 1766. A scheduler, which would be understood by one skilled in the art, is coupled to the processing unit 1750. The scheduler could be included within or operated separately from the base station 1770. The processing unit 1750 implements various processing operations of the base station 1770, such as signal coding, data processing, power control, input/output processing, or any other functionality. The processing unit 1750 can also support the methods and teachings described in more detail above. Each processing unit 1750 includes any suitable processing or computing device configured to perform one or more operations. Each processing unit 1750 could, for example, include a microprocessor, microcontroller, digital signal processor, field programmable gate array, or application specific integrated circuit.

Each transceiver 1752 includes any suitable structure for generating signals for wireless or wired transmission to one or more EDs or other devices. Each transceiver 1752 further includes any suitable structure for processing signals received wirelessly or by wire from one or more EDs or other devices. Although shown combined as a transceiver 1752, a transmitter and a receiver could be separate components. Each antenna 1756 includes any suitable structure for transmitting or receiving wireless or wired signals. While a common antenna 1756 is shown here as being coupled to the transceiver 1752, one or more antennas 1756 could be coupled to the transceiver(s) 1752, allowing separate antennas 1756 to be coupled to the transmitter and the receiver if equipped as separate components. Each memory 1758 includes any suitable volatile or non-volatile storage and retrieval device(s). Each input/output device 1766 facilitates interaction with a user or other devices (network communications) in the network. Each input/output device 1766 includes any suitable structure for providing information to or receiving/providing information from a user, including network interface communications.

Figure 18:
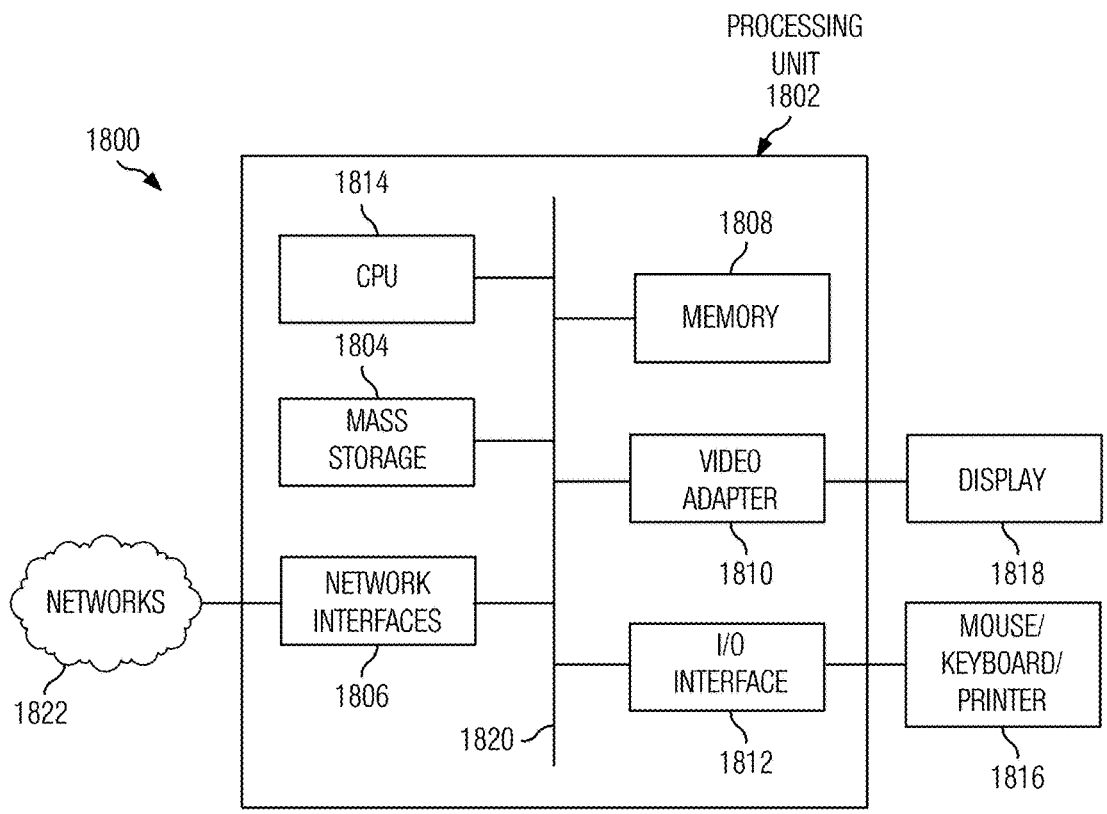
FIG. 18 is a block diagram of a computing system that may be used for implementing the devices and methods disclosed herein.

FIG. 18 is a block diagram of a computing system 1800 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1800 includes a processing unit 1802. The processing unit includes a central processing unit (CPU)

1814, memory 1808, and may further include a mass storage device 1804, a video adapter 1810, and an I/O interface 1812 connected to a bus 1820.

The bus 1820 may be one or more of any type of several bus architectures including a memory bus or memory controller, a peripheral bus, or a video bus. The CPU 1814 may comprise any type of electronic data processor. The memory 1808 may comprise any type of non-transitory system memory such as static random access memory (SRAM), dynamic random access memory (DRAM), synchronous DRAM (SDRAM), read-only memory (ROM), or a combination thereof. In an embodiment, the memory 1808 may include ROM for use at boot-up, and DRAM for program and data storage for use while executing programs.

The mass storage 1804 may comprise any type of non-transitory storage device configured to store data, programs, and other information and to make the data, programs, and other information accessible via the bus 1820. The mass storage 1804 may comprise, for example, one or more of a solid state drive, hard disk drive, a magnetic disk drive, or an optical disk drive.

The video adapter 1810 and the I/O interface 1812 provide interfaces to couple external input and output devices to the processing unit 1802. As illustrated, examples of input and output devices include a display 1818 coupled to the video adapter 1810 and a mouse, keyboard, or printer 1816 coupled to the I/O interface 1812. Other devices may be coupled to the processing unit 1802, and additional or fewer interface cards may be utilized. For example, a serial interface such as Universal Serial Bus (USB) (not shown) may be used to provide an interface for an external device.

The processing unit 1802 also includes one or more network interfaces 1806, which may comprise wired links, such as an Ethernet cable, or wireless links to access nodes or different networks. The network interfaces 1806 allow the processing unit 1802 to communicate with remote units via the networks. For example, the network interfaces 1806 may provide wireless communication via one or more transmitters/transmit antennas and one or more receivers/receive antennas. In an embodiment, the processing unit 1802 is coupled to a local-area network 1822 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an obtaining unit or module, a determining unit or module, an estimating unit or module, a selecting unit or module, a sharing unit or module, or an adapting unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method comprising:
   obtaining, by a first device in a communication system, a channel representation of a set of channels between the first device and a second device, the set of channels being over a set of subcarriers, the first device having multiple antenna ports, and the second device having one or multiple antenna ports;
   determining, by the first device, one or multiple communication filters in accordance with at least the channel representation, the channel representation for determining the one or multiple communication filters comprising a channel matrix with dimensions being specified in accordance with the multiple antenna ports of the first device and the one or multiple antenna ports of the second device; and
   communicating, by the first device, a signal over the set of subcarriers on at least one of the multiple antenna ports of the first device, the signal being filtered according to the one or multiple communication filters.

2. The method of claim 1, the obtaining the channel representation of the set of channels comprising:
   receiving the channel representation of the set of channels from the second device.

3. The method of claim 1, the obtaining the channel representation of the set of channels comprising:
   determining the channel representation of the set of channels in accordance with individual channel representations of the set of channels.

4. The method of claim 3, the channel representation being determined in accordance with a phase domain component of the set of channels and a power/amplitude domain component of the set of channels.

5. The method of claim 4, determining the channel representation comprising the phase domain component of the set of channels constrained under the power/amplitude domain component of the set of channels.

6. The method of claim 3, the obtaining the channel representation of the set of channels comprising:
   receiving, by the first device, reference signals transmitted on the set of channels over the set of subcarriers;
   estimating, by the first device, the individual channel representations in accordance with measurements of the reference signals; and
   determining, by the first device, the channel representation in accordance with the individual channel representations.

7. The method of claim 1, the obtaining the channel representation of the set of channels comprising:
   receiving, by the first device, an indication of a subcarrier index indicating a subcarrier of the set of subcarriers; and
   selecting, by the first device, a channel estimate associated with the subcarrier as the channel representation of the set of channels.

8. The method of claim 1, the one or more communication filters comprising one or more transmission precoders for a subset of the multiple antenna ports of the first device, or one or more reception combiners for the multiple antenna ports of the first device.

9. The method of claim 1, the set of channels corresponding to a subset of the set of subcarriers.

10. The method of claim 1, the communicating the signal comprising:
    transmitting a first message or receiving a second message.

11. A method comprising:
receiving, by a first device on multiple antenna ports of the first device, signals received on a set of channels over a set of subcarriers of a communication system;
determining, by the first device, a channel representation of the set of channels in accordance with the signals received on the set of channels over the set of subcarriers; and
transmitting, by the first device, the channel representation, the channel representation for determining one or multiple communication filters comprising a channel matrix with dimensions being specified in accordance with the multiple antenna ports of the first device and one or multiple antenna ports of a second device.

12. The method of claim 11, further comprising:
receiving, by the first device, resource allocation information associated with resources conveying the received signals.

13. The method of claim 11, the transmitting the channel representation comprising:
transmitting, by the first device, an indication of a subcarrier index associated with the channel representation, the subcarrier index indicating a subcarrier of the set of subcarriers.

14. The method of claim 11, the transmitting the channel representation comprising:
transmitting, by the first device, an indication of the channel representation.

15. A first device comprising:
a non-transitory memory storage comprising instructions; and
one or more processors in communication with the non-transitory memory storage, wherein the one or more processors execute the instructions to cause the first device to perform operations including:
obtaining a channel representation of a set of channels between the first device and a second device, the set of channels being over a set of subcarriers, the first device having multiple antenna ports, and the second device having one or multiple antenna ports;
determining one or more communication filters in accordance with at least the channel representation, the channel representation for determining the one or multiple communication filters comprising a channel matrix with dimensions being specified in accordance with the multiple antenna ports of the first device and the one or multiple antenna ports of the second device; and
communicating a signal over the set of subcarriers on at least one of the multiple antenna ports of the first device, the signal being filtered according to the one or multiple communication filters.

16. The first device of claim 15, the obtaining the channel representation of the set of channels comprising:
receiving the channel representation of the set of channels from the second device.

17. The first device of claim 15, the obtaining the channel representation of the set of channels comprising:
determining the channel representation of the set of channels in accordance with individual channel representations of the set of channels.

18. The first device of claim 17, the channel representation being determined in accordance with a phase domain component of the set of channels and a power/amplitude domain component of the set of channels.

* * * * *